US010735674B2

(12) United States Patent
Anthony et al.

(10) Patent No.: US 10,735,674 B2
(45) Date of Patent: Aug. 4, 2020

(54) CIRCULAR SCANNING TECHNIQUE FOR LARGE AREA IMAGING

(71) Applicant: Massachusetts Institute of Technology, Cambridge, MA (US)

(72) Inventors: Brian W. Anthony, Cambridge, MA (US); Xian Du, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/322,296

(22) PCT Filed: Sep. 19, 2017

(86) PCT No.: PCT/US2017/052276
§ 371 (c)(1),
(2) Date: Jan. 31, 2019

(87) PCT Pub. No.: WO2018/057517
PCT Pub. Date: Mar. 29, 2018

(65) Prior Publication Data
US 2019/0174079 A1   Jun. 6, 2019

Related U.S. Application Data

(60) Provisional application No. 62/397,067, filed on Sep. 20, 2016.

(51) Int. Cl.
*H04N 3/30* (2006.01)
*H04N 5/341* (2011.01)
(Continued)

(52) U.S. Cl.
CPC ......... *H04N 5/3415* (2013.01); *G02B 21/367* (2013.01); *G02B 27/58* (2013.01);
(Continued)

(58) Field of Classification Search
CPC .................................................. H04N 5/3415
(Continued)

(56) References Cited

U.S. PATENT DOCUMENTS 5,686,960 A * 11/1997 Sussman .............. G02B 26/106
348/218.1
5,805,659 A    9/1998  Tam
(Continued)

FOREIGN PATENT DOCUMENTS

WO   WO 2016/115203 A1   7/2016

OTHER PUBLICATIONS

Notice of Allowance dated Apr. 18, 2019 for U.S. Appl. No. 15/540,169; 14 pages.
(Continued)

*Primary Examiner* — Christopher S Kelley
*Assistant Examiner* — Asmamaw G Tarko
(74) *Attorney, Agent, or Firm* — Daly, Crowley, Mofford & Durkee, LLP

(57) ABSTRACT

A system for generating an image of a region of interest (ROI) of a target object, the system including a camera, a target stage configured to receive the target object, the target stage configured to provide a translational movement and a rotational movement of the target object, and a controller. The controller is configured to control the camera and target stage to iteratively shift the target along scan trajectories of sample locations to capture images of each of a plurality of concentric rings and sub-rings of a predefined radial pitch over the ROI, the sample locations represented by polar coordinates defining sectors of each of the sub-rings. The controller is further configured to extract super resolution (SR) pixels from the images to reconstruct an SR image of each of the rings in the polar coordinates, and project the SR images into Cartesian coordinate images.

12 Claims, 14 Drawing Sheets

(51) Int. Cl.
- H04N 5/349 (2011.01)
- G06T 3/40 (2006.01)
- G02B 21/36 (2006.01)
- G02B 27/58 (2006.01)

(52) U.S. Cl.
CPC .............. *G06T 3/4053* (2013.01); *H04N 3/30* (2013.01); *H04N 5/349* (2013.01); *G06T 2207/10056* (2013.01)

(58) Field of Classification Search
USPC .......................................................... 348/36
See application file for complete search history.

(56) References Cited

U.S. PATENT DOCUMENTS

| | | | |
|---|---|---|---|
| 6,011,763 | A | 1/2000 | Labinksky et al. |
| 7,372,937 | B2 | 5/2008 | Wang et al. |
| 7,424,089 | B2 | 9/2008 | Zhang et al. |
| 2003/0099022 | A1 | 5/2003 | Karin et al. |
| 2010/0079608 | A1* | 4/2010 | Wong ..................... G06T 3/4069 348/222.1 |
| 2010/0128111 | A1 | 5/2010 | Pommerenke et al. |
| 2010/0142757 | A1* | 6/2010 | Sandstrom ........... G02B 26/105 382/100 |
| 2017/0371142 | A1* | 12/2017 | Anthony ............... G02B 21/367 |
| 2019/0174079 | A1* | 6/2019 | Anthony .............. H04N 5/3415 |

OTHER PUBLICATIONS

PCT Search Report of the ISA for PCT Appl. No. PCT/US2016/013157 dated Mar. 11, 2016; 3 pages.

PCT Written Opinion of the ISA for PCT Appl. No. PCT/US2016/013157 dated Mar. 11, 2016; 12 pages.

Babacan et al.; "Variational Bayesian Super Resolution;" IEEE Transactions on Image Processing; vol. 20; No. 4; Apr. 2011; 16 pages.

Babakhani et al.; "A Comparison of the Performance Improvement by Collocated and Noncollocated Active Damping in Motion Systems;" IEEE/ASME Transactions on Mechatronics; vol. 18; No. 3; Jun. 2013; 9 pages.

Baker et al.; "Limits on Super-Resolution and How to Break Them;" IEEE Transactions on Pattern Analysis and Machine Intelligence; vol. 24; No. 9; Sep. 2002; 17 pages.

Barnard et al.; "High-Resolution Iris Image Reconstruction from Low-Resolution Imagery;" Advanced Signal Processing Algorithms, Architectures and Implementations XVI; Proc. of SPIE; vol. 6313, 6310D-1; Aug. 2006; 13 pages.

Blunt et al.; "In-Line Metrology of Functional Surfaces with a Focus on Defect Assessment on Large Area Roll to Roll Substrates;" Proceedings of the 13th International Conference of the European Society for Precision Engineering and Nanotechnology; Berlin; May 2013; 4 pages.

Bobach et al.; "Natural Neighbor Interpolation and Order of Continuity;" University of Kaiserslautern Computer Science Department; Jan. 2006; 18 pages.

Bonchev et al.; "Improving Super-Resolution Image Reconstruction by In-Plane Camera Rotation;" 13th Conference on Information Fusion; Jan. 2010; 7 pages.

Borman et al.; "Spatial Resolution Enhancement of Low-Resolution Image Sequences a Comprehensive Review with Directions for Future Research;" Laboratory for Image and Signal Analysis (LISA); Jul. 8, 1998; 64 pages.

Brown; "Multi-Channel Sampling of Low-Pass Signals;" IEEE Transactions on Circuits and Systems; vol. cas-28; No. 2; Feb. 1981; 6 pages.

Capel; "Image Mosaicing and Super-Resolution;" Robotics Research Group; The University of Oxford; Ph.D Thesis; Jan. 2001; 269 pages.

Cheo et al.; "Post-Corrections of Image Distortions in a Scanning Grating-Based Spectral Line Imager;" IEEE Photonics Technology Letters; vol. 25; No. 12; Jun. 15, 2013; 4 pages.

Devasia et al.; "A Survey of Control Issues in Nanopositioning;" IEEE Transactions on Control Systems Technology; vol. 15; No. 5; Sep. 2007; 22 pages.

Eielsen et al.; "Damping and Tracking Control Schemes for Nanopositioning;" IEEE/ASME Transactions on Mechatronics; vol. 19; No. 2; Apr. 2014; 13 pages.

Ekberg; "Development of Ultra-Precision Tools for Metrology and Lithography of Large Area Photomasks and High Definition Displays;" KTH, School of Industrial Engineering and Management (ITM); Production Engineering, Metrology and Optics; Stockholm, Ph.D. Thesis; Jun. 2013; 121 pages.

Fleming et al.; "An Experimental Comparison of PI, Inversion, and Damping Control for High Performance Nanopositioning;" 2013 American Control Conference (ACC); Jun. 17-19, 2013; 6 pages.

Freeman et al.; "The Design and Use of Steerable Filters;" IEEE Transactions on Pattern Analysis and Machine Intelligence; vol. 13; No. 9; Sep. 1991; 16 pages.

Gotoh et al.; "Color Super-Resolution from a Single CCD;" IEEE Workshop on Color and Photometric Methods in Computer Vision; Jan. 2003; 8 pages.

Greenbaum et al.; "Imaging Without Lenses: Achievement and Remaining Challenges of Wide-Field On-Chip Microscopy;" Natural Methods; vol. 9; No. 9; Sep. 2012; 7 pages.

Gu et al.; "Integral Resonant Damping for High-Bandwidth Control of Piezoceramic Stack Actuators with Asymmetric Hysteresis Nonlinearity;" Mechatronics 24; Jan. 2014; 9 pages.

Hansen et al.; "Deblurring Images, Matrices, Spectra, and Filtering;" Fundamentals of Algorithms; Siam; Jan. 2006; 145 pages.

Haralick et al.; "Textural Features for Image Classification;" IEEE Transactions on Systems, Man and Cybernetics; vol. SMC-3; No. 6; Nov. 1973; 12 pages.

Hardie et al.; "High Resolution Image Reconstruction from a Sequence of Roasted and Translated Frames and its Application to an Infrared Imaging System;" Opt. Eng. vol. 37; Jan. 1998; 27 pages.

Hardie et al.; "Joint MAP Registration and High-Resolution Image Estimation Using a Sequence of Undersampled Images;" IEEE Transactions on Image Processing; vol. 6; No. 12; Dec. 1997; 13 pages.

Huang et al.; "Image Restoration by Singular Valve Decomposition;" Applied Optics; vol. 14; No. 9; Sep. 1975; 4 pages.

Irani et al.; Improving Resolution by Image Registration; CVGIP; Graphical Models and Image Processing; vol. 53; No. 3; May 1991; 9 pages.

Jain et al.; "Flexible Electronics and Displays: High-Resolution, Roll-to-Roll, Projection Lithography and Photoablation Processing Technologies for High-Throughput Production;" Proceedings of the IEEE; vol. 93; No. 8; Aug. 2005; 11 pages.

Ju et al.; "Design of Optimal Fast Scanning Trajectory for the Mechanical Scanner of Measurement Instruments;" Scanning vol. 36; Mar. 18, 2013; 9 pages.

Keren et al.; "Image Sequence Enhancement Using Sub-Pixel Displacements;" IEEE Computer Society Conference on Computer Vision and Pattern Recognition (CVPR 88); Jul. 1988; 5 pages.

Kirkpatrick et al.; "Optimization by Simulated Annealing;" Science; vol. 220; No. 4598; May 13, 1983; 10 pages.

Leang et al.; "Feedback-Linearized Inverse Feedforward for Creep, Hysteresis, and Vibration Compensation in AFM Piezoactuators;" IEEE Transactions on Control Systems Technology; vol. 15; No. 5; Sep. 2007; 9 pages.

Lehmann et al.; "Survey: Interpolation Methods in Medical Image Processing;" IEEE Transactions on Medical Imaging; vol. 18; No. 11; Nov. 1999; 27 pages.

Lewis et al.; "Scattered Data Interpolation and Approximation for Computer Graphics;" ACM Siggraph Asia 2010 Course Notes; Dec. 2010; 73 pages.

Ljubicic et al.; "Development of a High-Speed Profilometer for Manufacturing Inspection;" Proc. SPIE 7767; Aug. 24, 2010; 8 pages.

(56) References Cited

OTHER PUBLICATIONS

Ljubicic; "High Speed Instrumentation for Inspection of Transparent Parts;" Massachusetts Institute of Technology; Thesis; Jun. 2013; Part 1; 150 pages.
Ljubicic; "High Speed Instrumentation for Inspection of Transparent Parts;" Massachusetts Institute of Technology; Thesis; Jun. 2013; Part 2; 136 pages.
Lowe; "Distinctive Image Features from Scale-Invariant Keypoints;" International Journal of Computer Vision; vol. 60; No. 2; Jan. 5, 2004; 28 pages.
Mahmood et al.; "A New Scanning Method for Fast Atomic Force Microscopy;" IEEE Transactions on Nanotechnology; vol. 10; No. 2; Mar. 2011; 14 pages.
Mahmood et al.; "Fast Spiral-Scan Atomic Force Microscopy;" IOP Publishing; Nanotechnology; vol. 20; Aug. 2009; 5 pages.
Maintz et al.; "A Survey of Medical Image Registration;" Medial Image Analysis; vol. 2; No. 1; Mar. 1998; 36 pages.
Molina et al.; "Image Restoration in Astronomy;" IEEE Signal Processing Magazine; Mar. 2001; 19 pages.
Nagahara et al.; "Lensless Imaging for Wide Field of View;" Optical Engineering 54; Feb. 23, 2015; 9 pages.
Nathan et al.; "Flexible Electronics: The Next Ubiquitous Platform;" Proceedings of the IEEE; vol. 100; May 13, 2012; 32 pages.
Park et al.; "Super-Resolution Image Reconstruction: A Technical Overview;" IEEE Signal Processing Magazine; May 2003; 16 pages.
Papoulis; "Generalized Sampling Expansion;" IEEE Transactions on Circuits and Systems; vol. cas-24; No. 11; Nov. 1977; 3 pages.
Parker et. al.; "Comparison of Interpolating Methods for Image Resampling;" IEEE Transactions on Medical Imaging; vol. MI-2; No. 1; Mar. 1983; 9 pages.
Patti et al.; "Superresolution Video Reconstruction with Arbitrary Sampling Lattices and Nonzero Aperture Time;" IEEE Transactions on Image Processing; vol. 6; No. 8; Aug. 1997; 13 pages.
Peleg et al.; "Improving Image Resolution Using Subpixel Motion;" Pattern Recognition Letters 5; Mar. 1987; 4 pages.
Pham et al.; "Influence of Signal-to-Noise Ratio and Point Spread Function on Limits of Super-Resolution;" Image Processing: Algorithms and Systems IV; Proc. of SPIE-IS&T Electronic Imaging; Jan. 2005; 12 pages.
Pham et al.; "Robust Fusion of Irregularly Sampled Data Using Adaptive Normalized Convolution;" EURASIP Journal on Advances in Signal Processing; May 17, 2005; 17 pages.
Poletto; "Enhancing the Spatial Resolution of a Two-Dimensional Discrete Array Detector;" Optical Engineering vol. 38; Oct. 1999; 10 pages.
Prasad; "Digital Superresolution and the Generalized Sampling Theorem;" Optical Society of America; vol. 24; No. 2; Feb. 2007; 15 pages.
Ribaric et al.; "Restoration of Images Blurred by Circular Motion;" First International Workshop on Image and Signal Processing and Analysis; Jun. 14-15, 2000; 8 pages.
Robinson et al.; "Fundamental Performance Limits in Image Registration;" Proceedings of the 2003 International Conference on Image Processing; Sep. 2003; 4 pages.
Rogers et al.; "Materials and Mechanics for Stretchable Electronics;" Science; vol. 327; Mar. 26, 2010; 6 pages.
Shewchuk; "Lecture Notes on Delaunay Mesh Generation;" Electrical Engineering and Computer Science; University of California, Berkeley; Sep. 20, 1999; 119 pages.
Stark et al.; "High-Resolution Image Recovery from Image-Plane Arrays, Using Convex Projections;" Journal of Optical Society of America; vol. 6; No. 11; Nov. 1989; 12 pages.
Tatem et al; "Super-Resolution Target Identification from Remotely Sensed Images Using a Hopfield Neural Network;" IEEE Transactions on Geoscience and Remote Sensing; vol. 39; No. 4; Apr. 2001; 16 pages.
Tuma et al.; "High-Speed Multiresolution Scanning Probe Microscopy Based on Lissajous Scan Trajectories;" IOP Publishing; Nanotechnology 23; Apr. 20, 2012; 9 pages.

Tuma et al.; "Optimal Scan Trajectories for High-Speed Scanning Probe Microscopy;" 2012 American Control Conference; Fairmont Queen Elizabeth, Montreal, Canada; Jun. 27-29, 2012; 6 pages.
Ur et al.; "Improved Resolution from Subpixel Shifted Pictures;" CVGIP: Graphical Models and Image Processing; vol. 54; No. 2; Mar. 1992; 6 pages.
Vandewalle et al.; "A Frequency Domain Approach to Registration of Aliased Images with Application to Super-resolution;" EURASIP Journal on Applied Signal Processing; vol. 2006; Article ID 71459; 14 pages.
Villena et al.; "Bayesian Combination of Sparse and Non-Sparse Priors in Image Super Resolution;" Journal Digital Signal Processing; vol. 23; Issue 2; Mar. 2014; 12 pages.
Villena et al.; "Bayesian Super-Resolution Image Reconstruction using an ϰ1 prior;" Proceedings of the $6^{th}$ International Symposium on Image and Signal Processing Analysis; Sep. 2009; 6 pages.
Wagner et al.; "Distributed Image Compression for Sensor Networks Using Correspondence Analysis and Super-Resolution;" Proceedings of the 2003 International Conference on Image Processing; Sep. 2003; 4 pages.
Weckenmann et al.; "Multisensor Data Fusion in Dimensional Metrology;" CIRP Annals—Manufacturing Technology; vol. 58; Dec. 2009; 21 pages.
Wheeler et al.; "Super-Resolution Image Synthesis Using Projections onto Convex Sets in the Frequency Domain;" Proc. SPIE5674; Computational Imaging III, 479; Mar. 31, 2005; 12 pages.
Yong et al.; "High-Speed Cycloid-Scan Atomic Force Microscopy;" IP Publishing; Nanotechnology 13; vol. 21; No. 36; Aug. 13, 2010; 5 pages.
Zomet et al.; "Robust Super-Resolution;" Proceedings of the 2001 IEEE Computer Society Conference on Computer Vision and Pattern Recognition; Dec. 2001; 6 pages.
Du et al.; "Concentric circle scanning system for large-area and high-precision imaging"; Optics Express 20014; vol. 23; No. 15; Jul. 27, 2015; 16 Pages.
Du et al.; "Concentric circular trajectory sampling for super-resolution and image mosaicing"; 2015 Optical Society of America; vol. 32; No. 2; pp. 293-304; Feb. 2015; 12 Pages.
PCT Search Report and Written opinion of the ISA dated Dec. 21, 2017 for International Application No. PCT/US2017/052276; 17 Pages.
International Preliminary Report on Patentability dated Jul. 27, 2017 from International Application No. PCT/US2016/013157; 10 Pages.
International Preliminary Report on Patentability dated Apr. 4, 2019 from International Application No. PCT/US2017/052276; 10 Pages.
Response to U.S. Non-Final Office Action dated Oct. 17, 2018 for U.S. Appl. No. 15/540,169; Response filed Jan. 9, 2019; 19 pages.
U.S. Non-Final Office Action dated Oct. 17, 2018 for U.S. Appl. No. 15/540,169; 19 pages.
Applied Image Inc.; http://www.aig-imaging.com/; Retrieved Apr. 12, 2019; 1 page.
Crum et al.; Non-Rigid Image Registration: Theory and Practice; The British Journal of Radiology; DOI: 10.1259/bjr/25329214; vol. 77; S140-S153; 2004; 14 pages.
Davies; Computer and Machine Vision: Theory, Algorithms, Practicalities; Fourth Edition; Jan. 2012; Part 1 of 6; 150 Pages.
Davies; Computer and Machine Vision: Theory, Algorithms, Practicalities; Fourth Edition; Jan. 2012; Part 2 of 6; 150 Pages.
Davies; Computer and Machine Vision: Theory, Algorithms, Practicalities; Fourth Edition; Jan. 2012; Part 3 of 6; 150 Pages.
Davies; Computer and Machine Vision: Theory, Algorithms, Practicalities; Fourth Edition; Jan. 2012; Part 4 of 6; 150 Pages.
Davies; Computer and Machine Vision: Theory, Algorithms, Practicalities; Fourth Edition; Jan. 2012; Part 5 of 6; 150 Pages.
Davies; Computer and Machine Vision: Theory, Algorithms, Practicalities; Fourth Edition; Jan. 2012; Part 6 of 6; 162 Pages.
Du et al.; "Controlled Angular and Radial Scanning for Super Resolution Concentric Circular Imaging"; Laboratory for Manufacturing and Productivity, MIT; Optical Society of America; 2016; 15 pages.

(56) References Cited

OTHER PUBLICATIONS

Lucchese et al.; "A Noise-Robust Frequency Domain Technique for Estimating Planar Roto-Translations"; IEEE Transactions on Signal Processing; vol. 48; No. 6; Jun. 2000; 18 pages.

Nasrollahi et al.; "Deep Learning Based Super-Resolution for Improved Action Recognition"; Imaging Processing Theory, Tools and Applications; Jan. 2015; 6 pages.

Peleg et al.; "A Statistical Prediction Model Based on Sparse Representations for Single Image Super-Resolution"; IEEE; Jan. 2013; 24 pages.

Rasti et al.; "Improved Iterative Back Projection for Video Super-Resolution"; IEEE $22^{nd}$ Signal Processing and Communications Applications Conference (SIU 2014); 4 pages.

Vandewalle et al.; "Super Resolution Images Reconstructed from Aliased Images"; LCAV—School of Computer and Communication Sciences; Jan. 2003; 8 pages.

Wang et al.; "Image Quality Assessment: From Error Visibility to Structural Similarity"; IEEE Transactions on Image Processing; vol. 13; No. 4; Apr. 2004; 14 pages.

\* cited by examiner

CIRCULAR SCANNING TECHNIQUE FOR LARGE AREA IMAGING

CROSS REFERENCE TO RELATED APPLICATIONS

This application is a U.S. National Stage of PCT application PCT/US2017/052276 filed in the English language on Sep. 19, 2017 and entitled "CIRCULAR SCANNING TECHNIQUE FOR LARGE AREA IMAGING," which claims the benefit under 35 U.S.C. § 119 of provisional application No. 62/397,067 filed Sep. 20, 2016, which application is hereby incorporated herein by reference.

STATEMENT REGARDING FEDERALLY SPONSORED RESEARCH

This invention was made with Government support under Grant No. CMMI1025020 awarded by the National Science Foundation (NSF). The Government has certain rights in the invention.

BACKGROUND

As is known in the art, so-called large-area microscopy, sampling, super-resolution (SR) and image mosaicing techniques find use in many applications. For example, demand for low-cost electronic devices, along with advances in materials, drives semiconductor and device manufacturing toward micro-scale and nano-scale patterns in relatively large areas. Similarly, imaging devices such as microscopes might be desirable for scientific and medical imaging. To inspect such micro and non-scale patterns (so-called high resolution patterns) over a large area requires high-precision imaging technologies. For example, fast frame grabbers and optical microscopy techniques facilitate imaging at micrometer and nanometer scales. However, the field of view (FOV) of such high-resolution microscopes fundamentally limits detailed pattern imaging over a large area.

Some current large-area microscopy solutions employ large FOV and high-resolution optical sensors, such as higher-powered optics and coupled device (CCD) arrays. However, such sensors increase the cost of an imaging system. Other current large-area microscopy solutions implement lens-free large-area imaging systems having relatively large FOV using computational on-chip imaging tools or miniaturized mirror optics. Some on-chip imaging techniques employ digital optoelectronic sensor arrays to directly sample light transmitted through a large-area specimen without using lenses between the specimen and sensor chip. Miniaturized mirror optics systems employ various mirror shapes and projective geometries to reflect light from mirror arrays into a FOV of a camera where the mirror array FOP is relatively large compared with the FOV of the camera. However, both on-chip imaging and miniaturized mirror optics systems have limited spatial resolution. Moreover, on-chip imaging is limited to transmission microscopy modalities, and miniaturized mirror optics experience distortion and low contrast (e.g., due to variations or defects in mirror surfaces, etc.).

An alternative approach to large-area microscopy is to implement high-precision scanners at an effective scanning rate and stitch individual FOV images together into a wide view. During this process, scanners acquire multiple frames over a region of interest (ROI). Raster scanning is commonly employed for scanning small-scale features over large areas. In raster scanning, samples are scanned back and forth in one Cartesian coordinate, and shifted in discrete steps in another Cartesian coordinate.

Multiple-image super-resolution (SR) techniques use sub-pixel overlapping of low-resolution (LR) images to reconstruct a high-resolution (HR) image. Typically, motion estimation of LR images is important for SR techniques, as poor motion estimation and subsequent registration are detrimental to SR. For example, signal-to-noise ratios (SNR) below a certain range may cause undesirable registration errors leading to edge jaggedness in the SR image thereby hampering the reconstruction of fine details. Usually image registration can be done either in a frequency or a spatial domain. Most frequency domain methods are based upon the fact that two shifted images differ by only a phase variation that can be estimated using a phase correlation method. Frequency domain methods have robustness to noises and separability of rotational and translational components because of their intrinsic Fourier representation of signals. Spatial domain methods, however, may use either an entire image or extracted feature vectors to estimate relative motion. Image registration techniques may achieve acceptable registration results, however, the widespread uses of these techniques are limited because of the complexity, computational cost and difficulty in validating the results, as well as their sensitivity to imaging conditions.

Instead of using complex image and computationally expensive registration techniques, several attempts have been made to use controlled or known motion between LR images for SR. Such attempts are based on the fact that interpolation for SR can be performed using a set of spatially, regularly shifted LR images and the SR problem can be modeled using the generalized sampling theorem (GST). Using GST, regular shifts of LR images are formulated in a forward image formation matrix and the aliasing is formulated as the combination of frequency sub-bands having different weights in each LR image. The relatively large determinant of the resultant matrix reduces noise amplification. Regular sub-pixel shifts of the LR images can be used to solve the maximization of the determinant for weakly regularized reconstructions.

Most shift-based SR methods concentrate on sampling by regular motion of entire LR images in lateral directions wherein a set of spatially sub-pixel shifted LR images having a first grid spacing are merged into a finer grid by up- and down-sampling techniques. A deblurring filter then may be used to deconvolve the combined image to achieve SR image.

Fast and accurate scanning requires precise positioning with low vibration and short settling times. However, fast positioning relies on high velocities and high accelerations that often induce mechanical vibrations. Techniques for reducing vibration in a raster scan tend to increase the size and cost of mechanical structures (e.g., requiring larger and more robust mechanical supports, etc.), or can be complex and/or sensitive to measurement noise during a scan (e.g., complex control systems, etc.).

SUMMARY

Another approach to reducing mechanical vibrations is to employ smooth scanning trajectories that limit jerk and acceleration without additional large mechanical structures or complex control techniques. Such trajectories include spiral, cycloid, and Lissajous scan patterns, which allow high imaging speeds without exciting resonances of scanners and without complex control techniques. However, such scan trajectories do not achieve uniform sample point spatial distribution in Cartesian coordinates, resulting in distortion errors in sampled images.

Thus, there is a need for improved large-area microscopy, sampling, super-resolution (SR) and image mosaicing systems and techniques.

This Summary is provided to introduce a selection of concepts in a simplified form that are further described below in the Detailed Description. This Summary is not intended to identify key or essential features or combinations of the claimed subject matter, nor is it intended to be used to limit the scope of the claimed subject matter.

In one aspect, a method of generating an image of a region of interest (ROI) of a target object by an imaging system is provided. The method includes establishing a plurality of concentric circular rings over the ROI.

In an embodiment, each of the plurality of concentric rings are provided having a radius incremented by a pitch value from an innermost concentric ring having a minimum radius to an outermost concentric ring having a maximum radius. The resulting regions defined by the rings may then be divided (e.g. uniformly divided) into sub-rings, each sub-ring having a predefined pitch. The rings and sub-rings may be further divided into sectors of predefined angular shifts. The method further includes correlating the sectors with polar coordinates, determining scan trajectories with a plurality of sampling positions correlated to the polar coordinates to capture images of each of the plurality of concentric rings and sub-rings, iteratively shifting (e.g. translating) the target along the scan trajectories and capturing images at the sampling positions, forming images of each ring in polar coordinates from the captured images, extracting super resolution (SR) pixels from the polar coordinate ring images to reconstruct an SR image of each of the rings in the polar coordinates, and projecting the SR images into Cartesian coordinate images.

In an embodiment, the sampling positions include each sector at its respective correlated polar coordinate.

In an embodiment, the imaging system includes a camera with a camera array of pixels and the determining sampling positions includes matching arrays of the camera array pixels with the sector polar coordinates, and wherein forming images of each ring in polar coordinates is performed by interpolation from captured camera array pixels.

In an embodiment, matching arrays of the camera array pixels with the sector polar coordinates is performed to within a predetermined offset which, in an embodiment, can be constrained by $|1-f_r(l,i,j)|<\beta_{\Delta r}$ and $|f_\alpha(l,i,j)|<\beta_{\Delta \alpha}$ In which:
$\beta_{\Delta r}$ is the maximum misalignment in radial offset
$\beta_{\Delta \alpha}$ is the maximum misalignment in angular offset where $$f_r(l, i, j) = \frac{1}{\sqrt{1+\left[\frac{(j-1)}{l \cdot M + (i-1)}\right]^2}},$$

$$f_\alpha(l, i, j) = \frac{(j-1)}{(l \cdot M + (i-1))^2 + (j-1)^2} \cdot \frac{dr}{dX} \cdot \frac{1}{d\alpha_l},$$

and
(i, j) is an array pixel on ring l having arrays of the size M×N.

In an embodiment, generating a reconstructed SR image includes performing iterative backpropagation with the formed polar coordinate images of each ring.

In an embodiment, reconstructing an SR image includes stitching (i.e. combining together the SR images of each ring into a combined SR image).

In another aspect, a system for generating an image of a ROI of a target object is provided. In an embodiment, the system includes a camera, a target stage configured to receive the target object, the target stage configured to provide a translational movement and a rotational movement of the target object, and a controller. In an embodiment, the controller is configured to control the camera and target stage to iteratively shift (e.g. translate) the target along scan trajectories of sample locations to capture images of each of a plurality of concentric rings and sub-rings of a predefined radial pitch over the ROI, the sample locations represented by polar coordinates defining sectors of each of the sub-rings, extract super resolution (SR) pixels from the images to reconstruct an SR image of each of the rings in the polar coordinates, and project the SR images into Cartesian coordinate images.

In an embodiment, the sample locations include polar coordinate of each of the sub-rings.

In an embodiment, sample positions are determined by matching the polar coordinates with pixels of the camera system within a predetermined shift and the controller is further configured to control the camera and target stage to capture the pixels matched with the polar coordinates and interpolate polar coordinate pixels from the captured camera pixels.

In an embodiment, each of the polar coordinate pixels is overlapped by at least two pixels of the camera system.

In another aspect, a method of generating an image of a ROI of a target object by an imaging system is provided.

In an embodiment, the method includes determining a plurality of concentric circular rings over the ROI, each of the plurality of concentric rings having a radius incremented by a pitch value from an innermost concentric ring having a minimum radius to an outermost concentric ring having a maximum radius, uniformly dividing each ring into sub-rings, each sub-ring having a predefined pitch, and dividing the rings and sub-rings into sectors of predefined angular shifts, correlating the sectors with polar coordinates, determining scan trajectories with a plurality of sampling positions for an imaging system, the imaging system having a camera pixel array correlated to the polar coordinates to within a predetermined offset, iteratively shifting the target along the scan trajectories and capturing images at the sampling positions, interpolating polar coordinates from the captured images to form images of each ring, extracting super resolution (SIR) pixels from the polar coordinate ring images to reconstruct an SR image of each of the rings in the polar coordinates, and projecting the SR images into Cartesian coordinate images.

In an embodiment, the predetermined is constrained by $|1-f_r(l,i,j)|<\beta_{\Delta r}$ and $|f_\alpha(l,i,j)|<\beta_{\Delta \alpha}$ In which
$\beta_{\Delta r}$ is the maximum misalignment in radial offset and
$\beta_{\Delta \alpha}$ is the maximum misalignment in angular offset where $$f_r(l, i, j) = \frac{1}{\sqrt{1+\left[\frac{(j-1)}{l \cdot M + (i-1)}\right]^2}},$$

-continued $$f_a(l, i, j) = \frac{(j-1)}{(l \cdot M + (i-1))^2 + (j-1)^2} \cdot \frac{dr}{dX} \cdot \frac{1}{d\alpha_i},$$

and (i, j) is an array pixel on ring l having arrays of the size M×N.

In an embodiment, generating a reconstructed SR image includes performing iterative backpropagation with the formed polar coordinate images of each ring and stitching together the SR images of each ring into a combined SR image.

BRIEF DESCRIPTION OF THE DRAWING FIGURES

Other aspects, features, and advantages of the concepts described herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

Figure 2A:
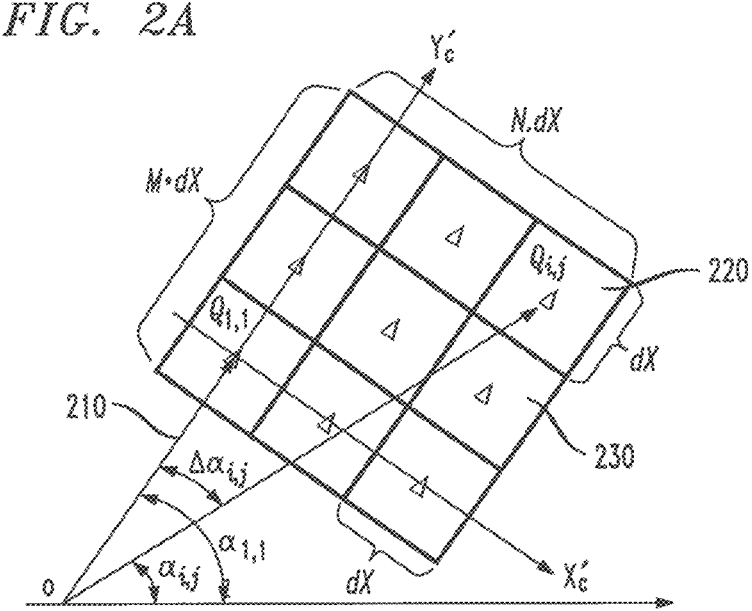
FIG. 2A is an illustrative diagram of pixels generated by a camera.
Figure 2B:
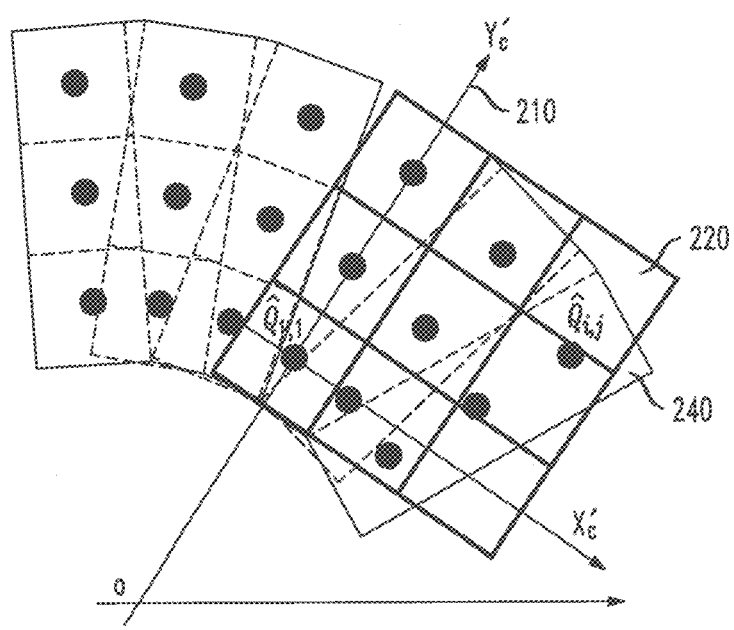
Figure 2C:
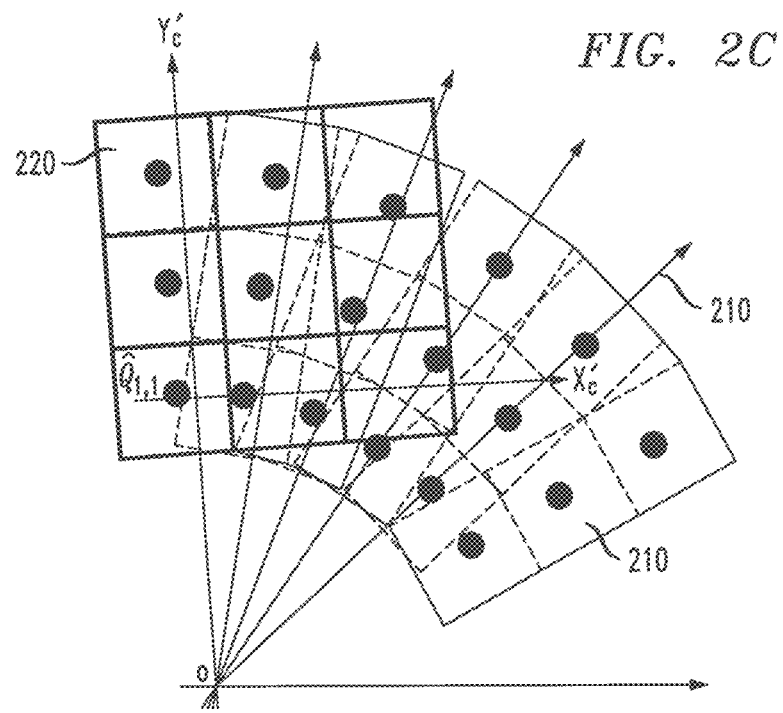
Figure 3:
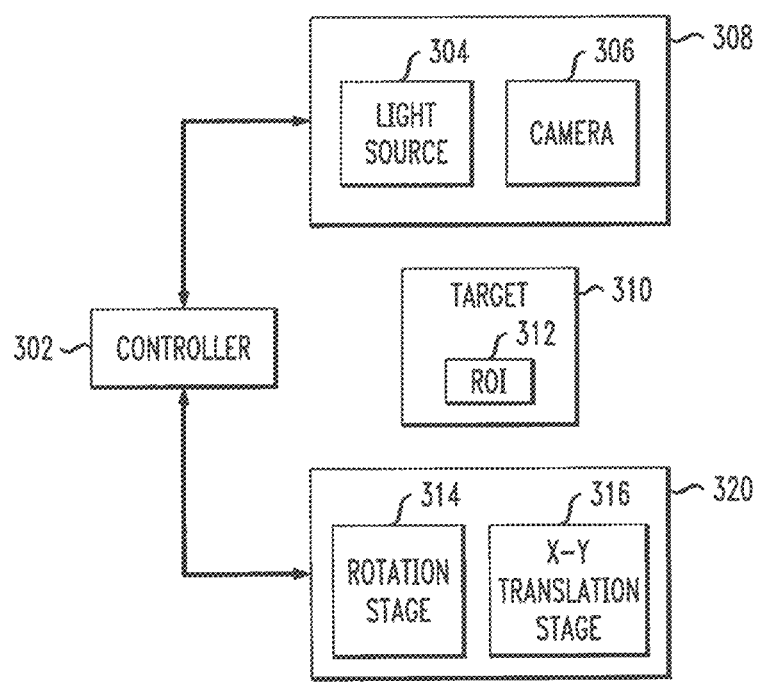
Figure 4:
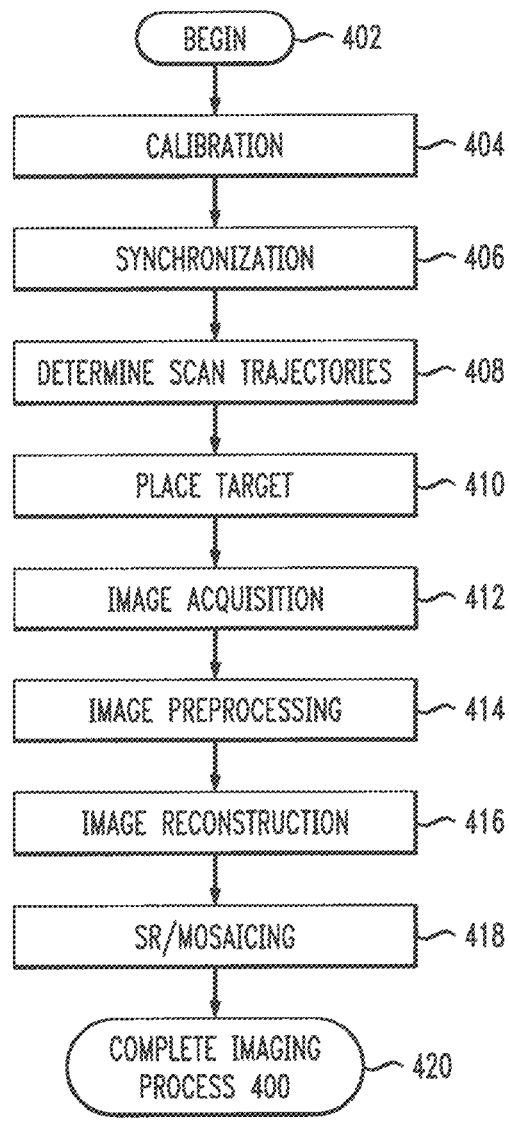
Figure 5:
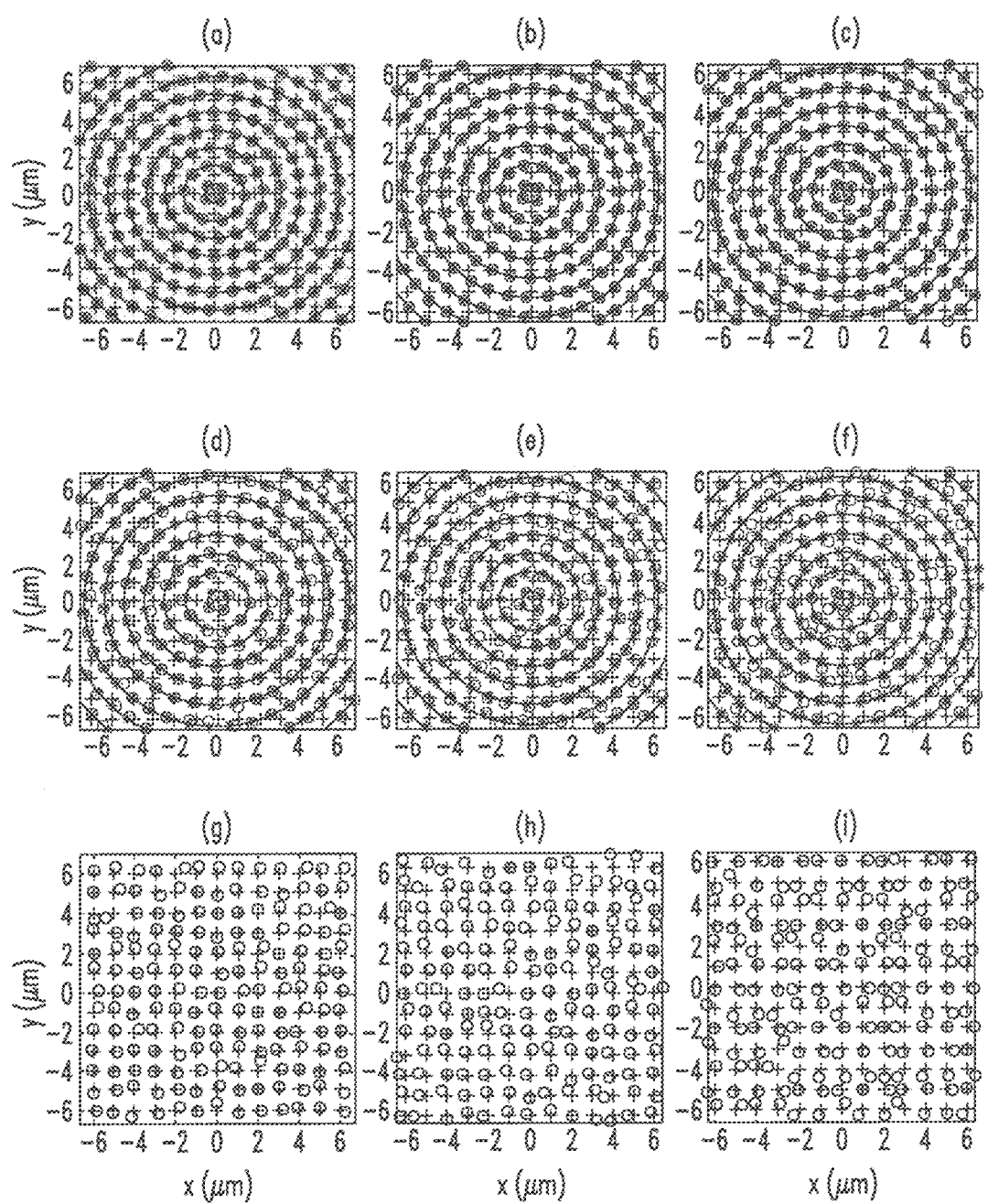
Figure 6:
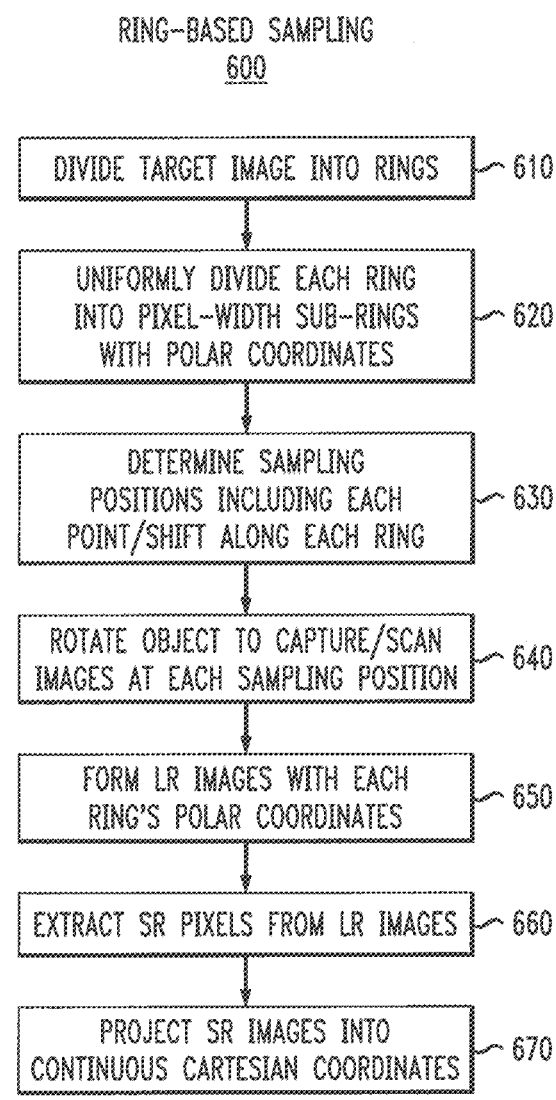
Figure 7:
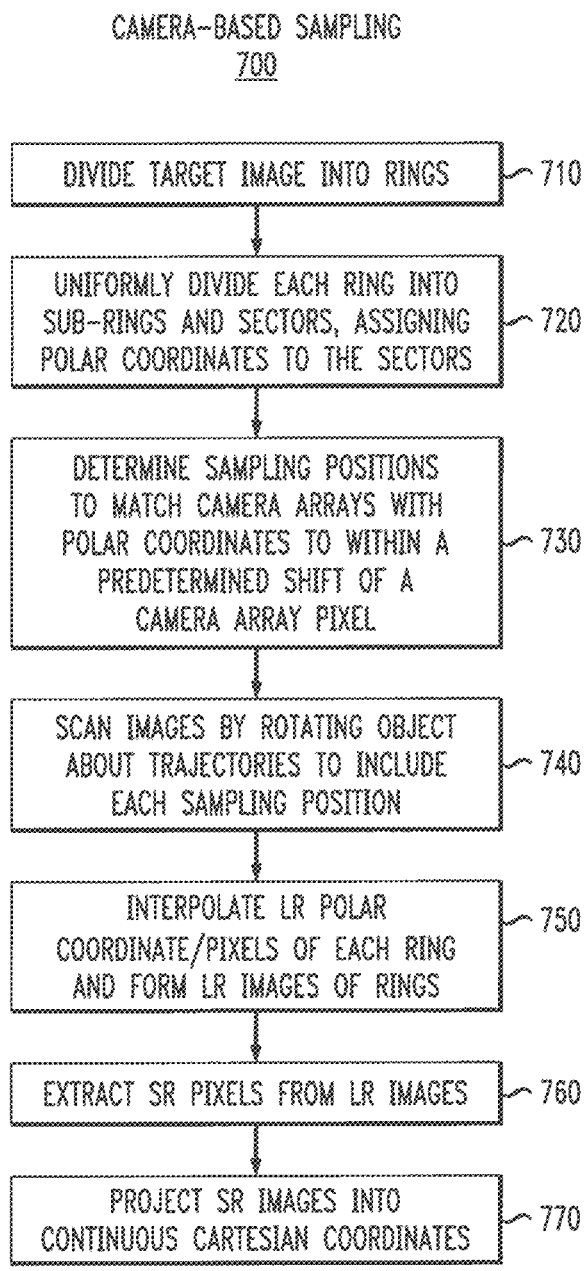
Figure 8B:
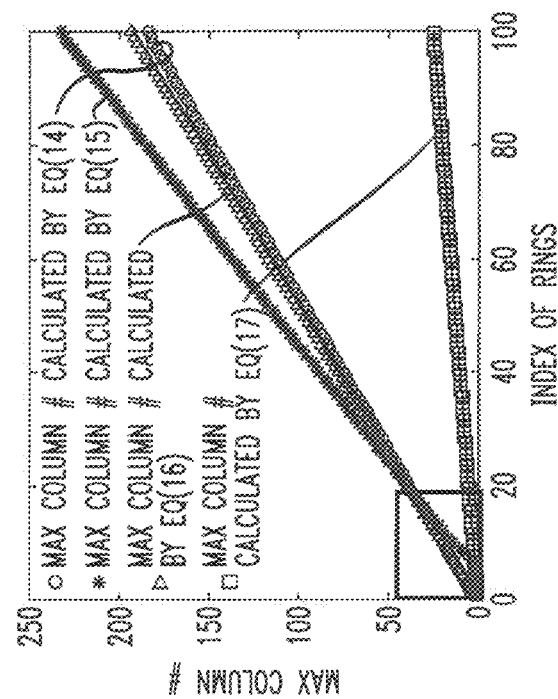
Figure 8A:
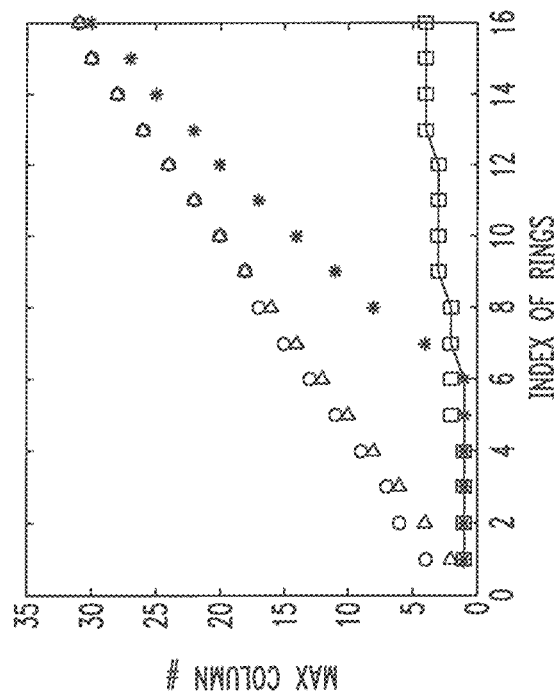
Figure 9A:
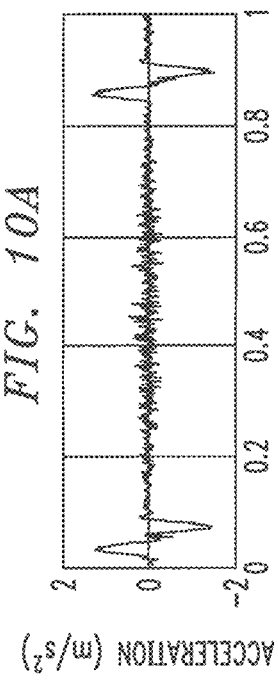
Figure 9B:
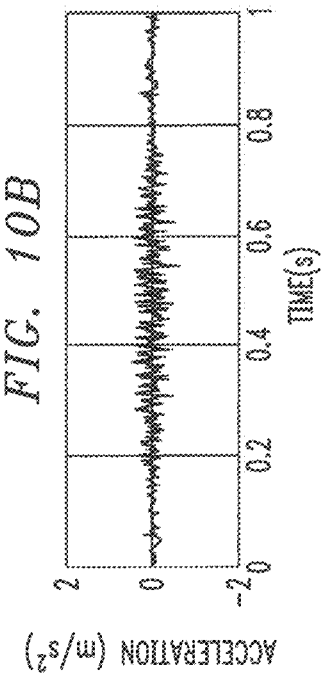
Figure 9C:
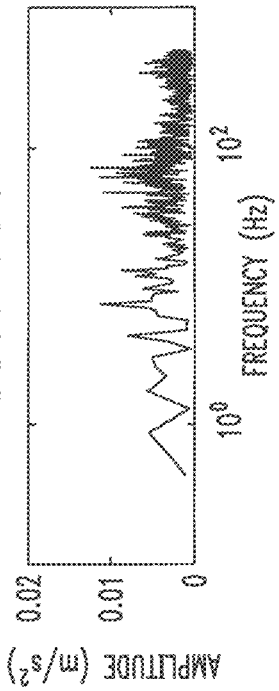
Figure 10A:
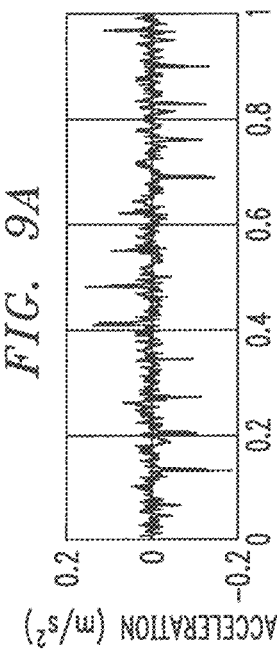
Figure 10B:
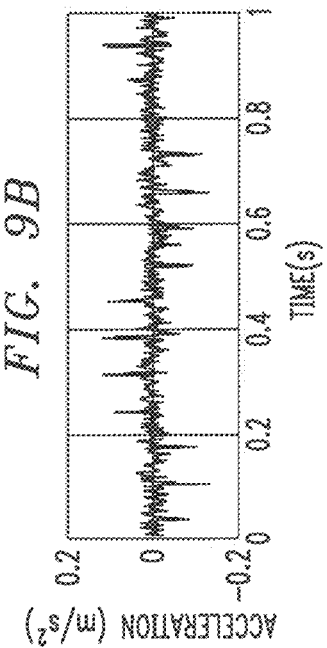
Figure 10C:
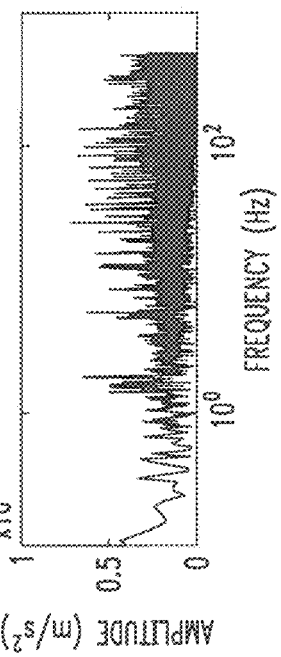
Figure 11A:
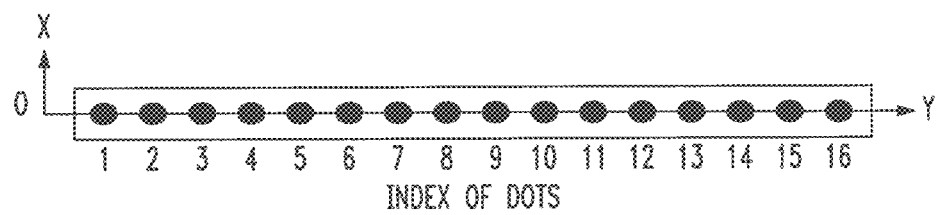
Figure 11B:
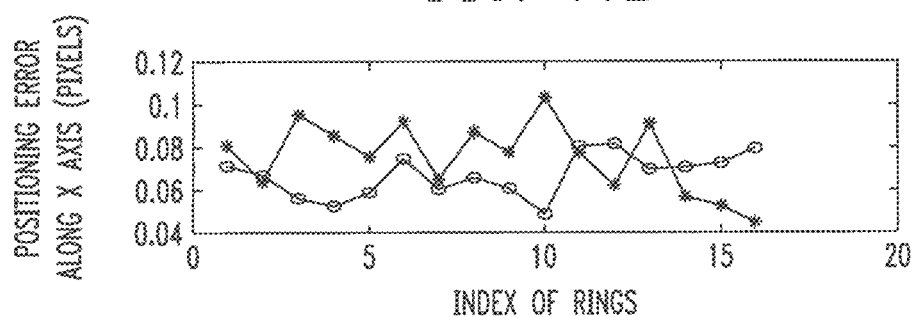
Figure 11C:
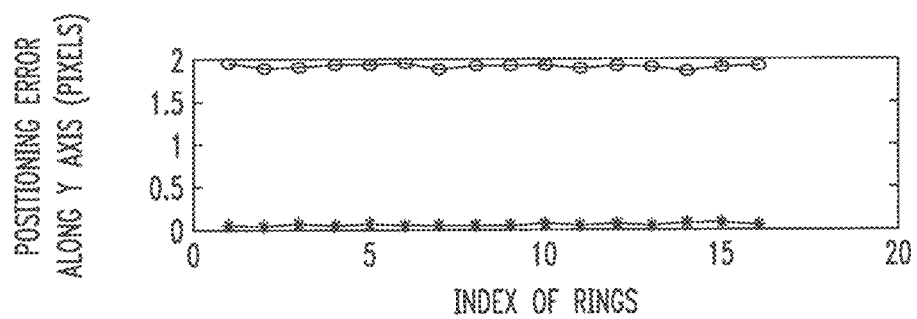
Figure 12:
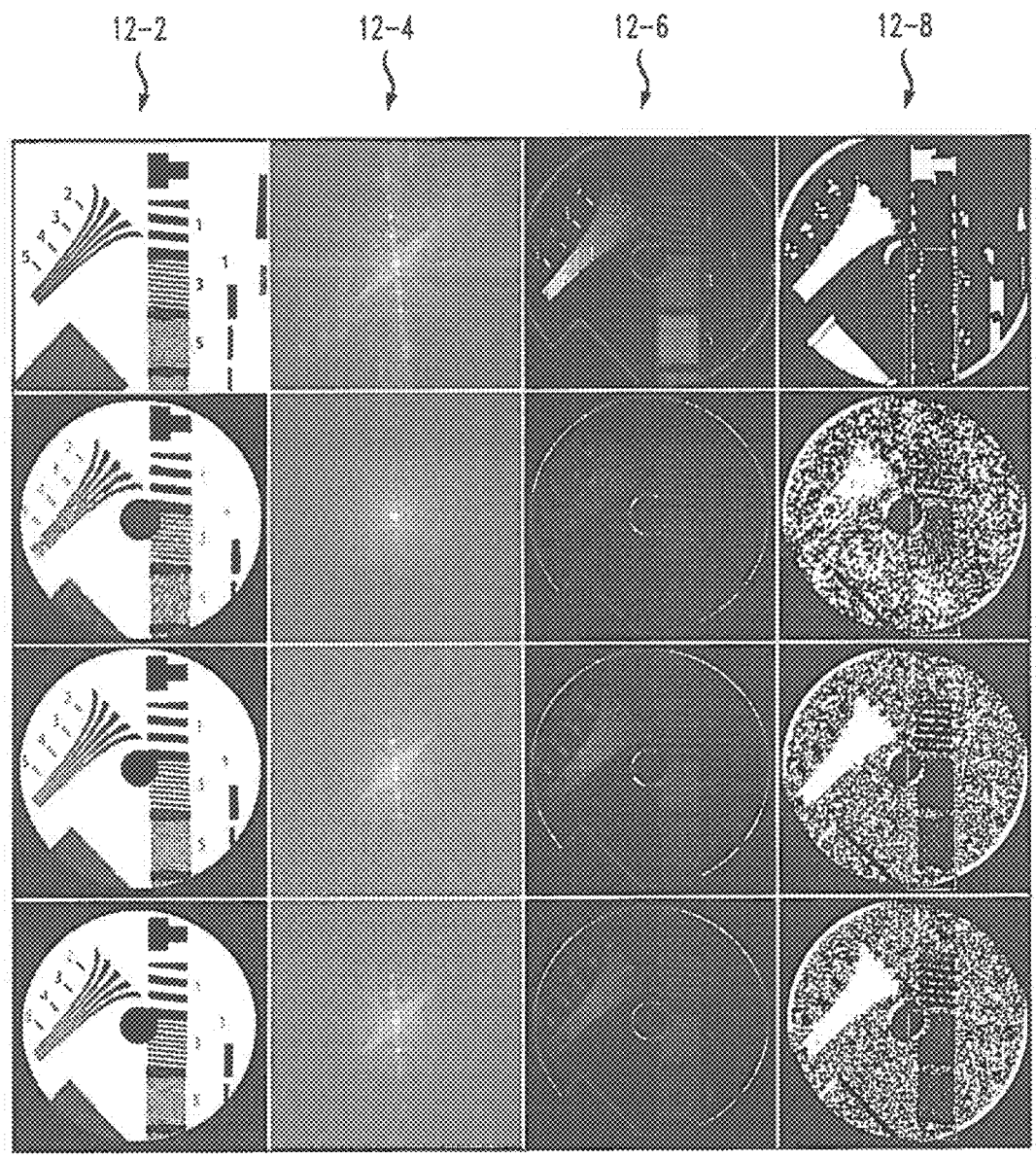
Figure 13:
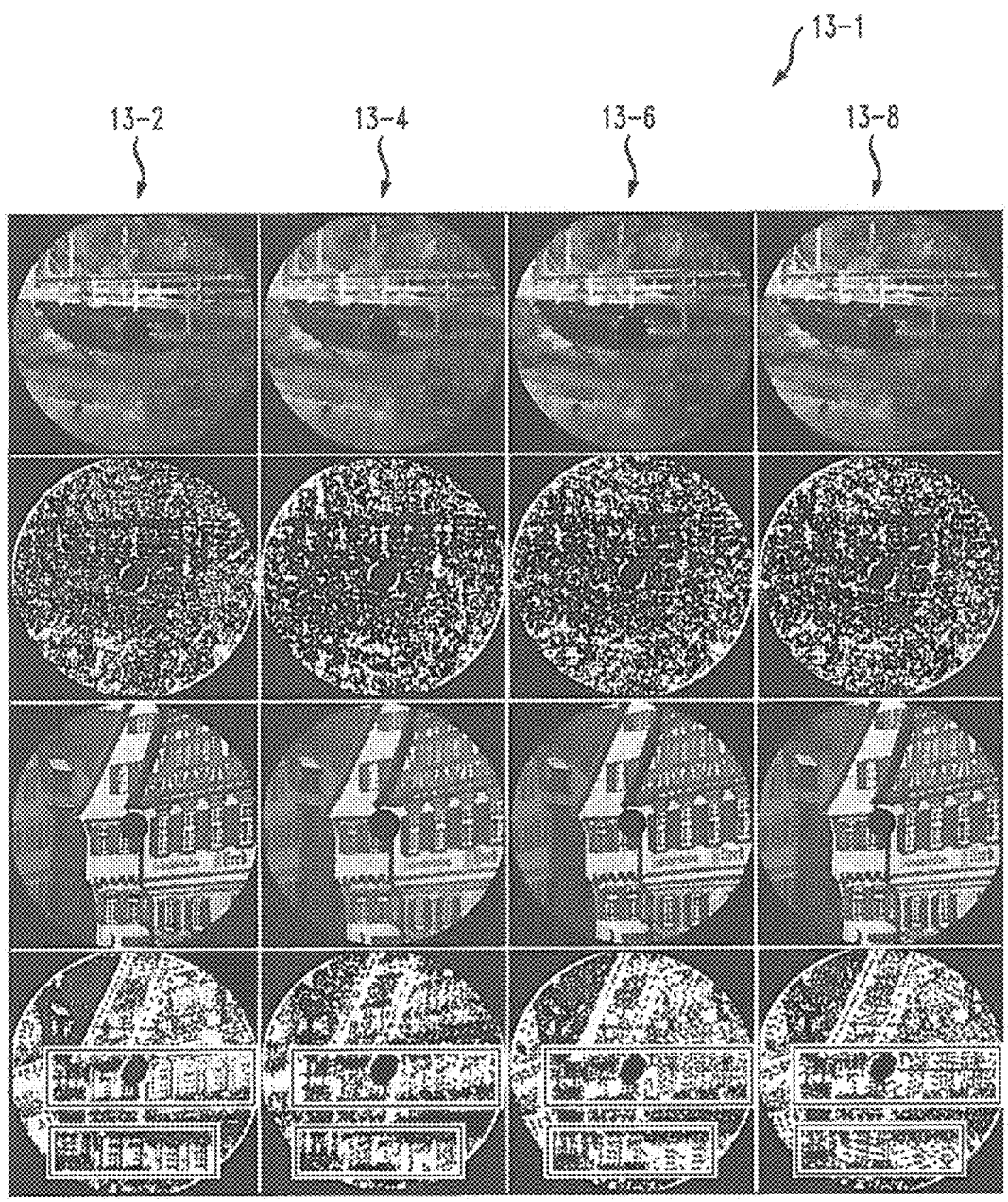
Figure 14A:
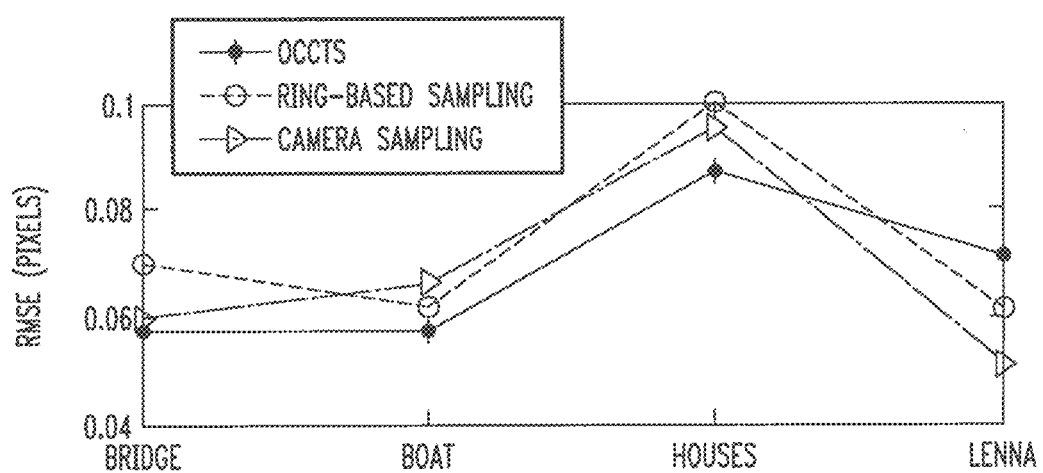
Figure 14B:
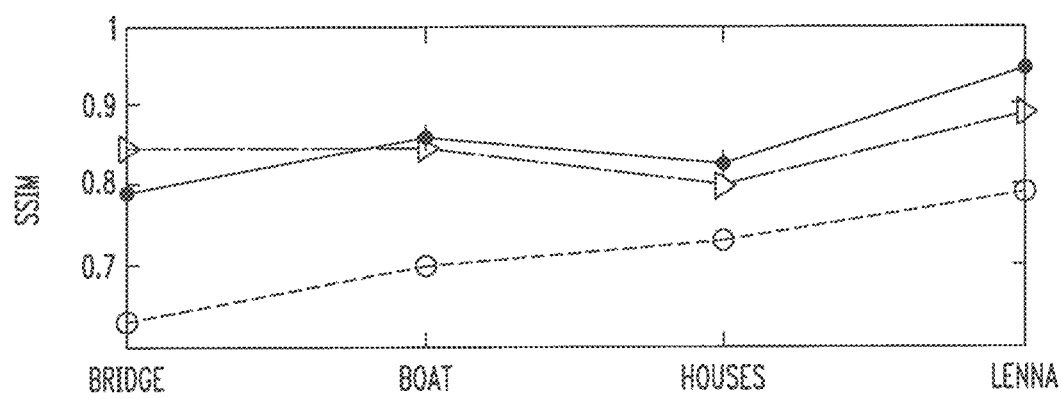

FIGS. 2B-C are illustrative diagrams of camera array pixels overlaid with polar ring array coordinates;

FIG. 3 is a block diagram showing an illustrative imaging system in accordance with described embodiments;

FIG. 4 is a flow diagram of an illustrative imaging technique which may be used, for example, by the imaging system of FIG. 3;

FIGS. 5A-F are diagrams showing concentric circular scanning trajectories and sample points for an illustrative scan;

FIGS. 5G-I are diagrams showing raster scanning trajectories and sample points for an illustrative scan;

FIG. 6 is a flow diagram of a ring based imaging technique used to sample each position of ring coordinate systems according to various embodiments;

FIG. 7 is a flow diagram of a camera based imaging technique which utilizes optimized sub-sampling positions of ring and camera coordinate systems according to described embodiments;

FIGS. 8A and 8B are plots illustrating a number of columns of Cartesian points vs. ring indices;

FIG. 9A is a plot of measured amplitude vs. time along an object's x-axis of scans utilizing a camera based technique;

FIG. 9B is a plot of measured amplitude vs. time along an object's y-axis of scans utilizing a camera based technique;

FIG. 9C is a plot of measured amplitude vs. frequency of acceleration utilizing a camera based technique;

FIG. 10A is a plot of measured amplitude vs. time along an object's x-axis of scans utilizing a ring based technique;

FIG. 10B is plot of measured amplitude vs. time along an object's y-axis of scans utilizing a ring based technique;

FIG. 10C is a plot of measured amplitude vs. frequency of acceleration utilizing a ring based technique;

FIG. 11A is an image of a line of dots during a scan;

FIG. 11B is a plot of X-axis positioning error vs. ring index as measured during scans of the image of FIG. 11A utilizing a ring based technique and a camera based technique;

FIG. 11C is a plot of Y-axis positioning error vs. ring index as measured during scans of the image of FIG. 11A utilizing a ring based technique and a camera based technique;

FIG. 12 is a table of image representations;

FIG. 13 is a table of scanned synthetic images;

FIG. 14A is a plot comparing root-mean-square error (RMSE) values analyzed in images utilizing optimized concentric circular trajectory sampling (CCTS), ring based sampling, and camera based sampling; and FIG. 14B is a chart comparing structural similarity index (SSIM) values analyzed in images utilizing optimized CCTS (OCCTS), ring based sampling, and camera based sampling.

DETAILED DESCRIPTION

Table 1 lists acronyms employed throughout this specification as an aid to understanding the described concepts and illustrative embodiments:

TABLE 1

| CAV | Constant Angular Velocity | CCD | Charge-Coupled Device |
|---|---|---|---|
| CCTS | Concentric Circular Trajectory Sampling | CLV | Constant Linear Velocity |
| CPC | Continuous polar Coordinates | CTS | Circular Trajectory Sampling |
| FOV | Field Of View | GST | Generalized Sampling Theorem |
| HPC | High resolution polar Coordinates | HR | High Resolution |
| IBP | Iterative BackPropagation | LPC | Low resolution polar Coordinates |
| LR | Low Resolution | NC | Normalized Convolution |
| NN | Nearest-Neighbor | OCCTS | Optimized Concentric Circular Trajectory Sampling |
| PSNR | Peak SNR | RMS | Root Mean Square |
| ROI | Region Of Interest | RS | Regular Shift |
| SAR | Simultaneous Auto-Regressive | SNR | Signal-to-Noise Ratio |
| SR | Super Resolution | SVD | Singular Value Decomposition |
| TV | Total Variation | | |

Electronics manufacturing of large-area surfaces that contain micro-scale and nano-scale features and large-view biomedical target imaging motivates the development of large-area, high-resolution and high-speed inspection and imaging systems. Poor motion estimation and subsequent registration are detrimental to providing a super-resolution (SR) image.

Described herein are a ring based polar grid sampling technique and a camera based sampling technique for achieving SR in an imaging system which utilizes a concentric circular trajectory sampling (CCTS) technique which provides a degree of precision which allows the generation of in SR images. Using the ring based polar grid and camera based sampling techniques described herein, one can precisely control regular radial and angular shifts in CCTS.

SR techniques can subsequently be applied ring by ring in radial and angular dimensions.

The proposed camera sampling technique described herein reduces, and ideally eliminates, transient camera movements typically resultant from movement of a camera along a conventional CCTS path. This is desirable since such transient camera movements can reduce accuracy of an imaging system.

Furthermore, the ring based polar grid and camera based sampling techniques described herein increase the sampling speed in CCTS while also preserving the SR accuracy. Experimental results demonstrate that the ring based polar grid and camera based sampling techniques described herein accurately discriminate SR pixels from blurry images.

While there are a few prior art SR algorithms that have been preliminarily developed to include rotational sampling, these methods use the estimate of a single rotation angle for each LR image registration for SR.

Active control of camera rotation has the potential to restore upper-limited resolution from LR images, given a rotation sampling and control solution.

PCT application no. PCT/US2016/013157 entitled Circular Scanning Technique For Large Area Inspection, assigned to the assignee of the present application and incorporated herein by reference in its entirety, describes a concentric circle trajectory sampling (CCTS) technique which can reduce motion vibration of a camera as well as image mapping errors compared to conventional raster scanning techniques. The CCTS technique can achieve fields of view which are larger than those achieved with conventional techniques and can do so with higher speeds than conventional techniques, while at the same time generating an SR image without a substantial increase (and ideally no increase) in hardware cost.

In an embodiment, before applying SR techniques described herein, a transform can be performed of rotational sampling LR pixels from polar coordinates to Cartesian coordinates, and then LR images can be acquired by interpolation. Embodiments demonstrate that the relative rotation between LR images for registration and SR can be controlled. However, motion in the radial dimension has been unexplored for SR because sampling points of CCTS are irregularly distributed along radial direction thereby limiting the SR image quality. Single pixel imaging (i.e. one pixel imaging) also limits the implementation of CCTS in practical applications.

In described embodiments, concentric circle sampling techniques are regularized and radial motion is incorporated into SR image reconstruction (a so-called "ring based sampling technique"). To improve the sampling speed and reduce vibration, embodiments are described which include a camera array based CCTS method (sometimes referred to herein as "camera based sampling") for SR.

Figure 1A:
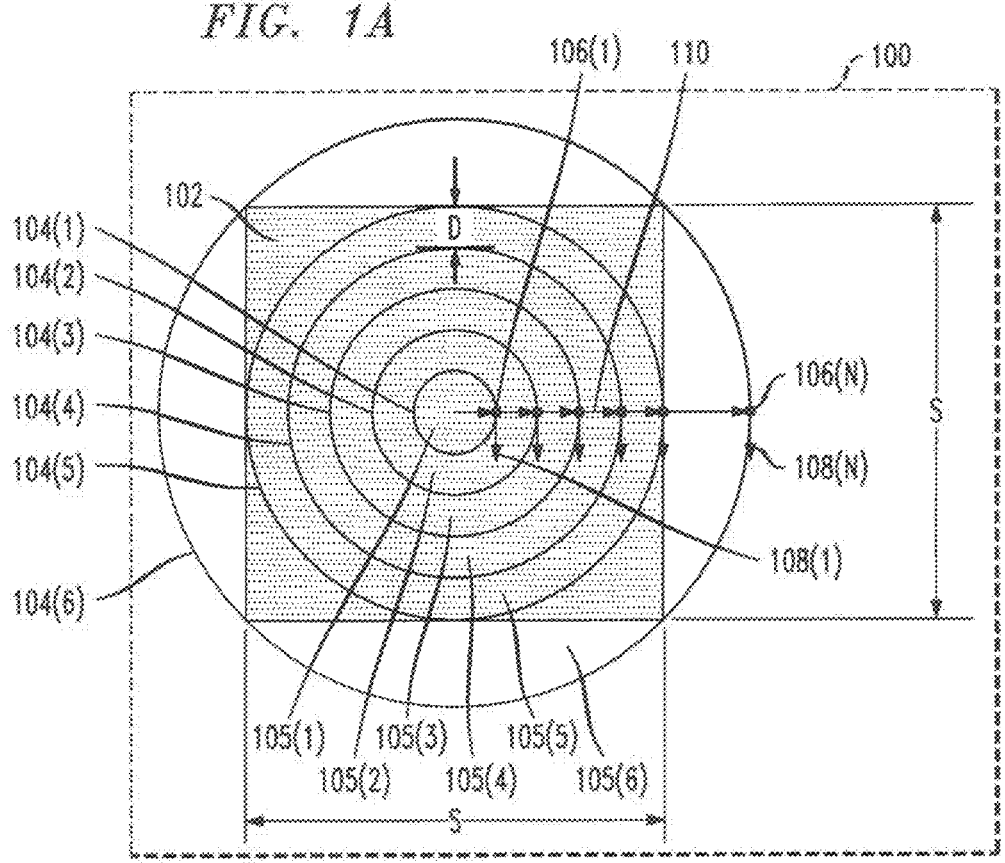
FIG. 1A is an illustrative diagram of circular annular rings generated over a target area in accordance with described embodiments.
Figure 1B:
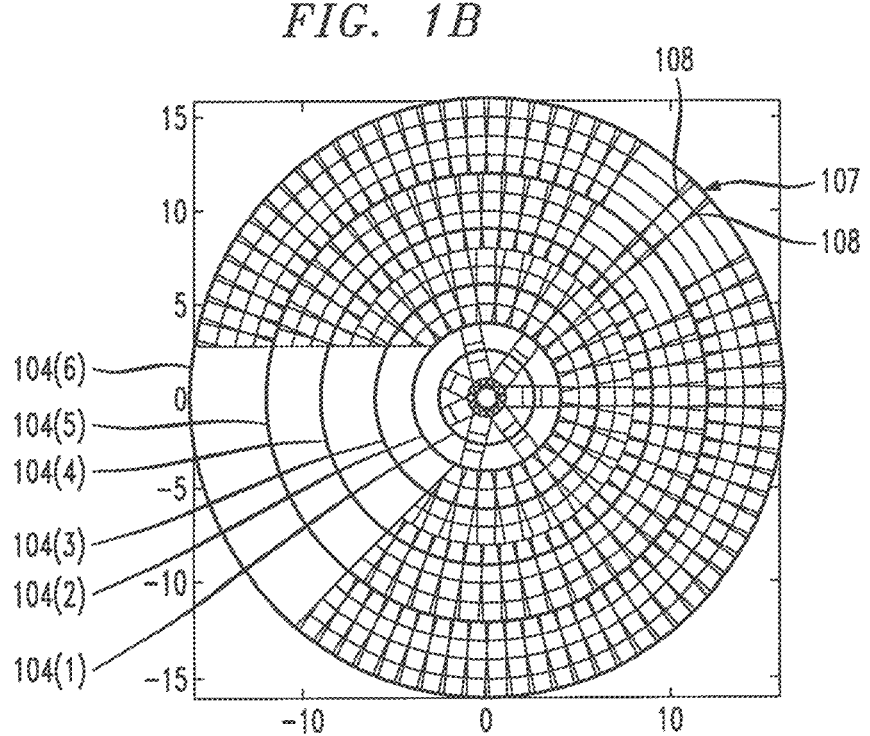
FIG. 1B is an illustrative diagram of sub-rings and polar coordinates generated within each of the rings of FIG. 1A.

Referring now to FIGS. 1A-1B in which like elements are provided having like reference numerals throughout the several views, a target object 100 (FIG. 1A) has a target area or a region of interest (ROI) 102 having dimensions S×S. A plurality of rings (say N rings), are established over ROI 102 with an outermost one of the rings 104(N) having a diameter selected such that the entire ROI 102 is contained within the ring 104(N).

To promote clarity in the description of the broad concepts described herein, in the illustrative embodiment of FIGS. 1A-1B six rings 104(1)-104(6) are established over ROI 102 with an outermost one of the rings 104(6) having a diameter selected such that the entire ROI 102 is contained within the ring 104(6). It should also be appreciated that ROI 102 is here provided having a square shape. In other embodiments, it may be preferable to select other shapes for an ROI (i.e. shapes other than a square). For example, any rectangular or oval shape (with a circular shape considered as a special case of an oval) may be used. In general, any regular (or substantially regular) geometric shape may be used.

In this illustrative embodiment (with ROI 102 having a square shape with sides of length S), ring 104(6) is provided having a radius equal to S/sqrt(2).

It should be appreciated that although in this illustrative embodiment, six (6) rings are shown, any number of rings (e.g. N rings where N is fewer or greater than 6) may also be used. In selecting the number of rings to use in any application a number of factors, including, but not limited to the size of a ROI, the number of sub-rings used, and pixel scale may be considered. In an embodiment, the number of rings may be selected based on the division of the ROI by a multiplication of the pixel scale and the number of sub-rings selected (e.g., number of rings=size of a ROI/(pixel scale*number of sub-rings)).

Each ring 104(1)-104(6) defines a boundary of a corresponding ring region 105(1)-105(6). Thus, ring 104(1) defines ring region 105(1), ring 104(2) defines ring region 105(2) and so on.

Referring now to FIG. 1B, each ring region 105(1)-105(6) is further divided by sub-rings denoted as 104($n$)($m$) where N=1-N (and in the illustrative embodiment of FIG. 1B, N=6 and M varies in each region). It should be appreciated that in FIG. 1B, portions of the sub-divided ring regions have been simplified (i.e. by removing some sub-rings) so that rings 104(1)-104(6) may be more clearly visible.

The number of sub-rings M used in each particular ring region 105(1)-105(6) may be the same or different and may be selected in accordance with a variety of factors including but not limited to upon LR pixel scale and expected SR pixel scale and/or empirical determination.

Figure 1C:
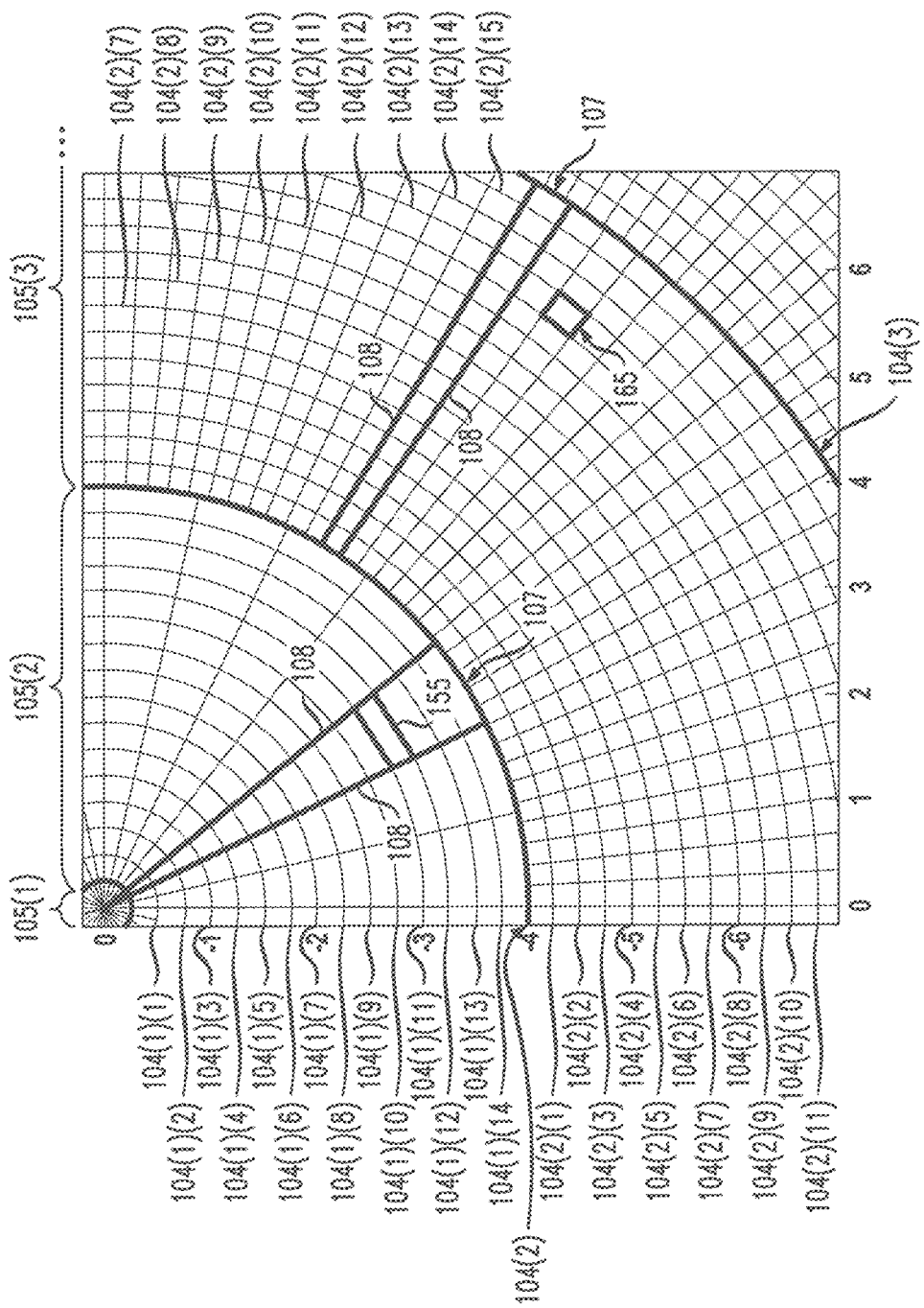
FIG. 1C is an illustrative diagram of high resolution (HR) sector bases generated for several rings in accordance with described embodiments.

As may be most clearly seen in FIG. 1C, each ring region is also divided into a plurality of sectors 107 defined by radially extending borders generally denoted 108. It should be appreciated that in FIG. 1C, portions of the sub-divided ring regions have been simplified (by removing some sub-rings) such that sector 107 and borders 108 may be more clearly visible.

The number of sectors 107 to use in any particular ring region 105 is selected based upon a variety of factors including, but not limited to LR pixel scale and expected SR pixel scale. In the illustrative embodiment of FIG. 1C, for example, regions 105(2) and 105(3) have different numbers of sectors. In some applications, all regions 105 may have an equal number of sectors and in other applications, all regions 105 may have a different number of sectors. In some applications, some regions may have the same number of sectors and some regions may have differing number of sectors.

Referring now to FIG. 1C, an enlarged portion of ROI 102 includes ring region 105(2) having radially directed boundaries 108 which define sectors 107 and sub-rings 104(1)(1)-104(1)(14) (i.e. M=15 for ring region 105(2)). The intersections of radial boundaries 108 and sub-rings 104(1)(1)-104(1)(14) define a plurality of segments 155 within ring region 105(2). For clarity, only a single one of ring region segments 155 is labelled in FIG. 1C.

Similarly, a plurality of segments 165 are formed in ring region 105(3) via the intersection of radial boundaries 108 and sub-rings 104(2)(1)-104(2)(15) (i.e. M=16 in ring region 105(3)). Again, for clarity, only a single one of the ring region segments 165 is labelled in FIG. 1C.

Thus, embodiments of a ring based scanning method include dividing a target region of interest (ROI) 102 into N annular segments 105(1)-105(N) via rings 104(1), 104(2), . . . 104(N) and further dividing each annular segment 105(1) ... 105(N) via sub-rings 104(1)(1), 104(1)(2), 104(1)(3), ... 104(1)(M), 104(2)(1), 104(2)(2), ... 104(N)(M). A variety of factors are considered in determining the number of rings to use in any particular application including, but not limited to, the size of ROI that users are interested to image.

In an embodiment, each sub-ring may be shifted radially with respect to adjacent rings by the pixel size of the imaging system (e.g., as shown and described in FIG. 3 and accompanying description).

As noted above and as illustrated in FIG. 1C, each ring region is divided angularly (e.g., by radial dividers 108 to generate sectors 107 and form segments (e.g., segments 155 and 165). In embodiments, the sectors can represent overlapping areas between imaging system pixels and result in HR sector bases having HR polar coordinates. In an embodiment, the tangential sampling density (TSD) for the maximum angular speed approximately equals $2\pi$ as the ring radius increases.

Alternatively speaking, the number of sampling points along any ring l can be $N_l=2\pi$. In order to make the computation easier, one can apply the integer operation [·] on this result and have, $$\widehat{N}_l = [2\pi P_l] \quad (1)$$

where $\widehat{N}_l$ is a sampling frequency;
$P_l$ is the radius of ring l; and
l is a ring index.

It should be appreciated that parallel sub-rings in this ring have the same number of sampling points.

Using the above sampling frequency $\widehat{N}_l$, once can achieve the angular increment in ring l, $$\Delta\Phi_l = \frac{2\pi}{\widehat{N}_l}. \quad (2)$$

Second, one can solve for the value of PI by regularizing the constraints in radial motion.

Eq. (16) and FIG. 3 in related patent application Ser. No. 15/540,169, offer a solution to radial motion that balances the missing and overlapping areas in circular sampling by forcing circle l with its radius $P_l$ to be the nearest to the intersections of rectangular pixels in the circle.

In present embodiments, one can relax these constraints and simplify the radial motion between rings by setting of the radius for the outmost sub-ring of ring l, $$P_l = l \cdot \omega_l \cdot dX \quad (3)$$

where $\omega_l$ is the number of sub-rings in ring l, and
dX is the size of each LR pixel.

In embodiments, the width of the sub-ring may be set equal to the size of the LR pixel.

In an embodiment, the image formation process can be simplified into a continuous-discrete transformation from scene to an acquired image ring by ring (sometime referred to herein as "ring sampling").

Some embodiments assume three coordinate systems in the SR process: continuous polar coordinates (CPC) $\rho-\theta$, discrete LR polar coordinates (LPC) $R-\phi$, and discrete HR polar coordinates (HPC) $\xi-\eta$ systems. HPC is an intermediate coordinate system that is assumed for the SR image in Cartesian coordinates. Given an image $I(\rho, \theta)$ in CPC system, LR pixels are acquired on equidistant spacing grids in radial and angular dimensions. The projection of the CPC scene to the LPC pixel at $(R, \phi)$ is formulated by, $$g(R, \phi) = \int_{R-\Delta R/2}^{R+\Delta R/2} \int_{\phi-\Delta\phi/2}^{\phi+\Delta\phi/2} b(R-\rho, \phi-\theta) \cdot I(\rho, \theta) d\theta d\rho + n(R, \phi), \quad (4)$$

where b(·) denotes the continuous blurring function centered at the coordinates (·), and
I(·) is the CPC intensity value at (·), and
n(·) is the imaging noise centered at (·).

Assume an HPC image $H(\xi,\eta)$ has a coordinate transformation with the CPC image $I(\rho,\theta)$, $(\rho,\theta)=s(\xi,\eta)$, and each LPC pixel at coordinates $(R, \phi)$ is a sector area covering m×n HPC pixels, where m and n are respectively the partition numbers of HPC pixels respectively in radial and angular dimensions. The HPC pixel has the same size of unit shifts, radial resolution $\Delta\rho$ and angular resolution $\Delta\theta$. The HPC image can present the LPC image by, $$g(R, \phi) = \sum_{\xi=R-m\cdot\Delta\rho/2}^{R+m\cdot\Delta\rho/2} \sum_{\eta=\phi-n\cdot\Delta\theta/2}^{\phi+n\cdot\Delta\theta/2} B((R, \phi) - (\xi, \eta)) \cdot H(\xi, \eta) + n(R, \phi), \quad (5)$$

where $B((R,\phi)-(\xi,\eta))$ denotes the discrete blurring function that assigns weights to the HR pixels acquired within the corresponding LR pixel at the coordinate $(R,\phi)$.

Without loss of generality, Eq. (5) can be valid for any LPC image acquisition using any in-plane motion assuming the continuous image $I(\rho,\theta)$ has a single value in each HR pixel area with the size of $(\Delta\rho, \Delta\theta)$.

Utilizing Eq. (5), each LR image can be constructed by assigning down-sampling and blurring operations to the original HR pixels. Extracting super resolution pixels from LR image is equivalent to solving the inverse image formation problem. In an embodiment, the following optimization objective is considered for SR image reconstruction, $$\widehat{H(R,\phi)} = \mathrm{argmin}\left(\sum_i \|g_i(R, \phi) - \widehat{g_i(R,\phi)}\|\right), \quad (6)$$

where $\|\cdot\|$ denotes the Euclidean Norm.

The above optimization problem can be solved, for example, using the iterative back-projection (IBP) methods, Projection Onto Convex Sets (POCS) and its special case with the Papoulis-Gerchberg algorithm.

In an embodiment, application of these methods results in SR images of all rings in the HRC system. Using polar-Cartesian transform, the SR images can be projected into the continuous Cartesian coordinates. After such projection, one can then interpolate the SR-pixel values in the continuous Cartesian coordinates for a digital image in integer grids.

Described below in conjunction with FIGS. 2A-2D, is a two dimensional array of pixels for CCTS sampling is described.

Referring now to FIG. 2A, a portion of a region interest (e.g. a portion of ROI 102 in FIGS. (1A-1C) includes a plurality of pixels (e.g. from a camera array). For example, in the illustrative embodiment of FIGS. 2A-2C, a camera array with a size of (M, N) pixels, e.g., pixel 220, and a pixel resolution of dX×dX is used. The camera has a local Cartesian system X'-Y'.

FIGS. 2B-2C are illustrative diagrams of camera array pixels overlaid with polar ring array coordinates. In an embodiment, the above method can be accelerated, with possible costs in resolution, by sampling the target area (herein referred to as "Camera Sampling") and matching the sampled images with the polar coordinate system described above. When a camera moves in plane, the relative positions between the camera pixels remain rigid. Hence, the neighboring camera pixels in the same CCTS can generate a sequence of relatively shifted LR images in polar coordinates. For example, the camera pixels of the same angular direction in each ring compose a one-dimensional array that rotationally samples the area in the ring and acquires the same image as that of ring-based CCTS. However, its sampling time will be only $1/\omega_l$ of the ring-based CCTS sampling time (refer to Eq. (3) and FIG. 1B). Furthermore, shifts between rings can be avoided which in turn reduces vibration.

In the illustrative embodiment of FIG. 2B, the camera array origin is assigned to the bottom left corner. The image center, denoted by o in FIG. 2C, can be used for the camera CCTS rotation center. Duplex integers i and j, i=1, ... M and j=1, ... N, are assigned to each camera-array pixel to respectively denote its indices of rows and columns in the camera-array's local Cartesian coordinates system $X_c'$-$Y_c'$. The center of each pixel $\{Q_{i,j}\}$ is highlighted by a solid triangle, and has polar coordinates (highlighted by arrows 210 and 230) registered by the coordinates X'-Y' and the motion of the camera. Let $\overline{OQ_{i,j}} = r_{i,j}$. One can have the camera array initially located by the pixel (1, 1). One can assign polar coordinates to all the camera-array pixels by, $$r_{i,j} = \sqrt{r_{1,1} + (i-1)dX)^2 + ((j-1)dX)^2}, \quad (7)$$

and $$\alpha_{i,j} = \alpha_{1,1} - \tan^{-1}(((j-1)dX)/(r_{1,1}+(i-1)dX)) \quad (8)$$

For each sub-ring, LR images are sorted by the order of $\Delta r_{i,j}$ and $\Delta \alpha_{i,j}$. To use the array of camera pixels for LR pixels the same way as for Ring-Based sampling, one can define the regular shifts by radial resolution $\Delta r$ and angular resolution $\Delta \alpha$ in the polar grids of HR images in advance. For each ring, the camera array is selected with its pixels 220 having both radial and angular coordinate shifts near enough to the regular shift in Ring-Based sampling for SR. This selection offers accurate and smoothing interpolation result for LR image for Ring-Based SR—sampling trajectories that have the sampling points aligned with or equidistant to the interpolation coordinates. Hence, to replace Ring-Based sampling by Camera Sampling, embodiments include a positioning difference and shift regularity in both radial and angular directions.

In an embodiment, assume each ring in Eq. (3) has the same width of M·dX as that of the camera array described above. As detailed above, the pixels $\{Q_{i,1}\}$ of the camera array form one-dimensional arrays. Rotating the one-dimensional arrays, called one column array, with the angular increment of Eq. (2) for sampling, one can acquire the same sampling positions as for Ring-Based sampling (see FIG. 1B). For ring l, let r=l·M·dX. Clustering pixels of each ring into arrays of the size M×N, one can measure the positioning difference between the paired pixels of Camera Sampling and Ring-Based Sampling by, $$E_r(i, j) = \frac{\sqrt{(l \cdot M + (i-1))^2 + ((j-1))^2}}{(l \cdot M + (i-1))} - 1, \quad (9)$$

and $$E_\alpha(i, j) = \frac{\tan^{-1}\left(\frac{j-1}{l \cdot M + (i-1)}\right)}{\frac{j-1}{l \cdot M}} - 1, \quad (10)$$

respectively for radial and angular directions. To incorporate the pixel array $\{Q_{i,j}\}$, i=1, ..., M, j=1, ..., N, into camera array for sampling, the positioning difference above can be constrained by $$E_\alpha(i,j) < \beta_r, \quad (11)$$

and, $$E_\alpha(i,j) < \beta_\alpha. \quad (12)$$

where $\beta_{\Delta r}$ and $\beta_{\Delta \alpha}$ are thresholds for the misalignments respectively in radial and angular shifts. Array pixel (i, j) on ring l is allowed for sampling when $$|1 - f_r(l, i, j)| < \beta_{\Delta r}, \quad (13)$$

and, $$|f_\alpha(l, i, j)| < \beta_{\Delta \alpha}, \quad (14)$$

Here $$f_r(l, i, j) = \frac{1}{\sqrt{1 + \left[\frac{(j-1)}{l \cdot M + (i-1)}\right]^2}}$$

and $$f_\alpha(l, i, j) = \frac{(j-1)}{(l \cdot M + (i-1))^2 + (j-1)^2} \cdot \frac{dr}{dX} \cdot \frac{1}{d\alpha_l}.$$

In an embodiment, Eqs. (11)-(14) provide criteria for determining the camera array size N that corresponds to the maximum number of columns in the ring array.

Referring to FIG. 3, an imaging system 300 includes a controller 302 coupled to an imager 308 and a target support structure 320. Imager 308 includes light source 304 to illuminate at least portions of target 310 as necessary so as to enable camera 306 to capture images of a ROI 312 of target 310. In embodiments, camera 306 can be a high-speed (e.g., equal or faster than about 250 frames per second) and/or digital camera.

Target support structure 320 includes rotation stage 314 to provide rotational movement of target 310 around a Z-axis with respect to imager 308, and X-Y translation stage 316 to provide X-Y translational movement of target 310 with respect to imager 308. The X, Y and Z-axes are orthogonal.

In operation, target 310 is placed on rotation stage 314 to allow imager 308 to scan ROI 312. Controller 302 controls motion of rotation stage 314 and X-Y translation stage 316 and operation of light source 304 and camera 306. In some embodiments, controller 302 includes a high-speed frame grabber (not shown) to capture images from camera 306. In described embodiments, imager 308 is kept stationary during scans.

FIGS. 4, 6 and 7 are flow diagrams showing illustrative processing that can be implemented within an imaging system (e.g., within an imaging system such as that shown and described above in conjunction with FIG. 3). Rectangular elements (typified by element 402 in FIG. 4), herein denoted "processing blocks," represent computer software instructions or groups of instructions Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Turning now to FIG. 4, a flow diagram of an imaging process 400 for rotational scanning, for example by imaging system 300 of FIG. 3, begins at block 402. Since the working stage and the camera have independent coordinate system, at block 404, camera calibration includes the registration of camera coordinates (e.g., of camera 306) and stage coordinates (e.g., of target support structure 320), and setting the illumination (e.g., by light source 304 such that a camera or other imaging device can collect image information from a region of interest). To sample the motion of the stage in the scanned images, the stage coordinates are registered in the camera coordinates by aligning the camera and stage and registering the rotation center of the image. A magnification factor (MF) and illumination system might be customized during calibration.

At block 406, a synchronization procedure may be performed. For example, controller 302 may coordinate the rotation speed of a stage (e.g., of target support structure 320) and a frame-grab rate of an imaging system (e.g. camera 306 such that images are precisely acquired at predefined positions in a peripheral direction along all circles (e.g., along scan trajectories 104). Controller 302 moves the stage along the radial direction to extend the FOV. When the stage moves to a desired position, camera 306 is triggered (e.g., by controller 302) to acquire an image.

At block 408, scan trajectories 104 are determined to acquire an image of a target ROI. At block 410, the target is placed (i.e. positioned or otherwise disposed) for image acquisition. Processing then proceeds to block 412 in which the target object is manipulated (e.g. shifted and rotated) for the camera to acquire one or more images (e.g., a plurality of images for mosaicing). In embodiments, the target object is disposed on a target support structure (e.g. target support structure 320) and the support structure is manipulated (e.g. via rotational and translational movements) such that the imaging system can capture images by the ROI. At block 414, image preprocessing including, for example, noise and blurring correction is performed. At block 416, image reconstruction is performed. At block 418, SR and/or mosaicing is performed and then the process ends as shown in block 420. SR might be performed, for example, using IBP techniques. SR and mosaicing techniques will be described in greater detail below.

FIGS. 5A-5F illustrate the sampling CCTS trajectories between ±6 μm for radial velocities ω=20°/s, 40°/s, 90°/s, 180°/s, 360°/s, and 720°/s, with a pitch p=1 μm. Solid lines and starred lines '*' are respectively the desired CCTS trajectories and sample positions, and 'o' and '+' are the achieved sample position and Cartesian coordinates. As can be seen from FIGS. 5A-5I, the sampling points and desired points match accurately up to ω=360°/s. To compare the mapping accuracy, FIGS. 5G-5I illustrate the raster scanning trajectories between ±6 μm for v=0.5 mm/s, 2 mm/s, and 4 mm/s. For these various linear velocities, little difference can be visualized between their mapping errors.

Referring now to FIG. 6, a ring based imaging technique is used to sample each position of ring coordinate systems according to various embodiments. Processing begins at block 610, in which a target image is divided into a plurality of concentric rings, with each ring having an inner and outer diameter of a particular pitch. At block 620, each ring is divided into sub-rings having a difference of one pixel in diameter from one another. The sub-rings are further divided into sectors (e.g., sector 155 of FIG. 2C) by radially directed boundaries (e.g., boundaries 150 of FIG. 2A). In embodiments, the sector positions may be established using polar coordinate system.

In an embodiment, the number of sectors defining a circumference of a ring is an integer that can be divided evenly (divided into 2 π r) into the circumference and the width of each sector approximates the size of a camera pixel or overlaps at least two pixels of the camera imaging system. At block 630, a sampling position is determined for each polar coordinate of each sub-ring. Then, at block 640, the target object is rotated while images are scanned at each sampling position and at block 650. Utilizing the reconstruction methods described above, e.g., iterative backpropagation (IBP), SR pixels can be extracted (block 660) from the LR images to form an SR image of each ring. The polar coordinate-based images can then be stitched together and projected (block 670) into continuous Cartesian coordinates.

Referring now to FIG. 7 is a flow diagram showing steps of an imaging technique for optimized sub-sampling ("camera based") positions of ring and camera coordinate systems according to described embodiments (i.e. a so-called "camera-based" technique). Processing begins at block 710, in which a target image is divided into concentric rings, each ring having an inner and outer diameter of a particular pitch. At block 720, the rings are further uniformly divided in sub-rings such as described above with respect to steps 620 and 630 of FIG. 6.

Determining the optimal number of rings and sectors to achieve a desired resolution is described herein with respect to Eqns. 11-14. At step 730, sampling positions are determined by matching camera arrays with polar coordinates to within a predetermined offset such as described above with respect to equations 11-14 in an embodiment of the invention. After determining the sampling positions, the target object is rotated about trajectories as indicated in step 740 and images are captured at the sampling positions. The polar coordinates of the rings are then interpolated from neighboring Camera Array coordinates such as according to known interpolation methods. A step 760 of extracting SR pixels from the polar coordinates is then executed, such as utilizing backpropagation techniques described herein, and then performing a step 770 of projecting the SR images into continuous Cartesian coordinates.

FIGS. 8A-8B are charts comparing the number of rings to the maximum number of columns of Cartesian points scanned utilizing a Camera Based approach according to described embodiments. The maximum number of columns are calculated utilizing equations 11-14, respectively, with βr=0.1, βα=0.1, βΔα=0.25, and βΔr=0.1. When the camera array is located far from the rotation center, the shifts of array pixels in the radial and angular dimensions of the global polar coordinates can be approximated by the difference of their local coordinates. The maximum column numbers approximately linearly increase with the sampling radii growth. However, the angular gradient constraint provides a slower growth of maximum column number for camera sampling. The resulting maximum column number for each radius is highlighted by a line (see FIG. 8A) that is dominated by the angular gradient constraint (Eq. (14)). This is reasonable because the sampling method has approximately linear growth of radii while the angular growth is much slow to maintain the sampling uniformity in Cartesian coordinates. The curves determined by Equations (11-12) have similar growth whereby a camera sampling has equal priority in both angular and radial directions.

FIGS. 9A and 10A are plots of measured acceleration vs. time along the object's x-axis of scans utilizing camera based and ring based approaches, respectively, according to described embodiments. It should be noted that the y-axis scale in FIG. 9A is an order of magnitude less than the y-axis scale in FIG. 10A. Thus, the amplitude values (i.e. y-axis values) in FIG. 9A are substantially less than the amplitude values (i.e. y-axis values) in FIG. 10A. Accordingly, comparing FIGS. 9A and 10A, reveals that the acceleration of the motion utilizing the camera based technique involves much less acceleration than the ring based technique according to an embodiment.

FIGS. 9B and 10B are plots of measured acceleration vs. time along an object's y-axis of scans utilizing camera based and ring based techniques, respectively, according to described embodiments. It should be noted that the y-axis scale in FIG. 9B is an order of magnitude less than the y-axis scale in FIG. 10B. Thus, the amplitude values (i.e. y-axis values) in FIG. 9B are substantially less than the amplitude values (i.e. y-axis values) in FIG. 10B. Accordingly, comparing FIGS. 9B and 10B, reveals that the acceleration of the motion utilizing the camera based technique involves much less acceleration than the ring based technique according to an embodiment.

FIGS. 9C and 10C are plots of measured amplitude vs. frequency spectra of acceleration utilizing camera based and ring based techniques, respectively, according to described embodiments. It should be noted that the y-axis scale in FIG. 9C are an order of magnitude less than the y-axis scale in FIG. 10C. Thus, the amplitude values (i.e. y-axis values) in FIG. 9C are substantially less than the amplitude values (i.e. y-axis values) in FIG. 10C. Accordingly, comparing FIGS. 9C and 10C, reveals that the acceleration of the motion utilizing the camera based technique involves much less acceleration than the ring based technique according to an embodiment.

Accordingly, the data of FIGS. 9A-10B reveals that the acceleration of the motion utilizing a camera based technique involves much less acceleration than a ring based technique. As shown, the only transient behavior or jerks between rings caused by radial motion and angular motion in constant angular velocity (CAV) CCTS can be avoided in camera sampling. The vibration magnitude can be reduced by one order of magnitude, thus reducing sampling errors.

FIG. 11A is an image of a line of dots during a scan according to described embodiments. FIGS. 11A and 11B are plots of positioning errors vs. ring index as measured during scans utilizing a Ring Based approach and Camera Based approach, respectively, according to described embodiments. To evaluate the reduction of positioning errors using camera sampling, a line of spots (see FIG. 11A) was tracked at the start of each ring of both ring-based scan and camera scan. The spots are dots of the fourth zone of a dot distortion target with the diameter 0.2 mm and dot pitch 0.4 mm. The dot center coordinates are identified by the Hough Transform circle detection algorithm. A 1× lens was used to acquire m spot images at the start of each ring for both scans (m=−16 in the following). Assuming the rotation center is located at 'O', the spots regularly shift one pixel along Y direction for each ring to simulate the transient motion between rings in the ring-based scan. As shown in FIG. 11A), the spots are indexed, j=1, . . . n and n=16. The dot centers for each scan can be registered in two matrices $[X_{i,j}]$ and $[Y_{i,j}]$, i=1, . . . , n, j=1, . . . m, where $X_{i,j}$ and $Y_{i,j}$ are respectively the X and Y coordinates of the $i^{th}$ dot at its start of the $j^{th}$ ring. The motion variation for each dot can be calculated by $$\text{var } X_{i,j} = X_{i,j} - \frac{\sum_j X_{i,j}}{m}, \quad (15)$$

and, $$\text{var } Y_{i,j} = Y_{i,j} - \frac{\sum_j Y_{i,j}}{m}. \quad (16)$$

The positioning errors along X and Y coordinates are calculated by $$Ex_i = \sqrt{\frac{1}{n-1} \overset{\circ}{a_i} |\text{var} X_{i,j} - u_{xi}|^2}, \quad (17)$$

and $$Ey_j = \sqrt{\frac{1}{n-1} \overset{\circ}{a_i} |\text{var} Y_{i,j} - u_{yi}|^2}, \quad (18)$$

where, $u_{xi} = \frac{1}{n} \overset{\circ}{a_j} \text{var} X_{i,j}$ and $u_{yi} = \frac{1}{n} \overset{\circ}{a_j} \text{var} Y_{i,j}$.

FIGS. 5(b) and (c) are the positioning errors calculated by the equations (17-18). Apparently, the transient motion along Y-axis between rings incurs ten times more positioning errors in ring-based sampling than those in camera sampling. Positioning errors along X-axis are similar in both scans. Note that one pixel CCTS has transient radial motion at any sampling position such that its positioning errors are much more than those of ring-based sampling.

FIG. 12 is a table of image representations 12-1. Table 12-1 has four rows and four columns in which a first column 12-2 of scanned images includes: a base Cartesian image of a target (column 1, row 1), 2) a blurry and noisy LR image from a Ring Based scan (column 1, row 2); a reconstructed SR image from a Ring Based scan (column 1, row 3); a reconstructed SR image from a Camera Based scan (column 1, row 4).

Table 12-1 further includes a second column 12-4 of images representing respective Fourier spectra of the images of the first column and a third column 12-6 of images representing the respective strengths of dominant energies of the images of the first column. Table 12-1 further includes a fourth column 12-8 of images representing the respective directed dominant energy of the images of the first column.

In an embodiment, LR images are convolved from the original image in polar coordinates with a 4×4 average blurring function using either the ring-based sampling algorithm or camera sampling, and generate 16 sequential LR images with regular angular and radial shifts for each sampling method. Second, the blurred images are downsampled in LR polar coordinates. Third, the blurred images are deteriorated with the zero-mean Gaussian white noise with 40 dB peak signal-noise ratio (PSNR). FIG. 12 illustrates sampling and SR results of a ROI in ISO_12233. One of the degraded LR images is shown in the third row. The third and fourth rows are respectively the POCS SR results of ring-based sampling and camera sampling images. Both of the SR results have uncovered the resolution up to the fifth level in the target and significant differences are not apparent between the SR results. Note: we implemented three iterative SR algorithms including POCS, IBP and Papoulis-Gerchberg in MATLAB® (tolerance=$10^{-5}$ was used as the iteration stop criteria) and found that POCS is faster and more accurate than the latter two. Other variation-based SR algorithms in can take expensive computation time and may not achieve desirable SR quality. Hence, we demonstrate and evaluate the POCS SR results.

FIG. 13 is a table of images 13-1. Table 13-1 has four rows and four columns in which a first column 13-2 includes: scanned synthetic images including: a bridge (column 1, row 1); the direction of dominant "oriented energy" of the first row (column 1, row 2); images of houses (column 1, row 3); and a direction of dominant "oriented energy" of the third row (column 1, row 4).

Table 13-1 further includes: a second column of the respective LR images, a third column of the SR images generated using a ring based technique, and a fourth column of the SR images generated using a camera based technique.

It should be appreciated that the results between the sampling methods do not reflect distinctive differences. To quantitatively evaluate the SR images of the two sampling methods, the RMSE values are calculated between the SR images and their corresponding reference images.

FIG. 14A is a plot comparing root-mean-square error (RMSE) values analyzed in images utilizing optimized CCTS, Ring Based sampling, and Camera Based sampling. FIG. 14(b) is a chart comparing structural similarity index (SSIM) values analyzed in images utilizing OCCTS, Ring Based sampling, and Camera Based sampling. The RMSE values of optimized CCTS (OCCTS) SR results in are included for comparison. The difference of SR RMSE made by using camera and ring-based sampling methods is insignificant. Both methods degrade SR for boat, bridge and houses targets compared to OCCTS sampling method. Note: These RMSE values of SR images include the errors from both sampling and SR processes. In practical implementation, transient behaviors in OCCTS can introduce more errors to degrade its SR result.

Although described herein in relation to standard imaging, embodiments could be employed in other imaging modalities, such as dark field or fluorescence microscopy. Further described embodiments could employ integrated and synchronized multi-modal imaging sensors.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor can be analog, digital or mixed-signal.

While the exemplary embodiments have been described with respect to processes of circuits, described embodiments might be implemented as a single integrated circuit, a multi-chip module, a single card, or a multi-card circuit pack. Further, as would be apparent to one skilled in the art, various functions of circuit elements might also be implemented as processing blocks in a software program. Such software might be employed in, for example, a digital signal processor, microcontroller, or general purpose computer.

Some embodiments might be implemented in the form of methods and apparatuses for practicing those methods. Described embodiments might also be implemented in the form of program code embodied in tangible media, such as magnetic recording media, hard drives, floppy diskettes, magnetic tape media, optical recording media, compact discs (CDs), digital versatile discs (DVDs), solid state memory, hybrid magnetic and solid state memory, or any other machine-readable storage medium, wherein, when the program code is loaded into and executed by a machine, such as a computer, the machine becomes an apparatus for practicing the claimed invention.

Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a processing device, the program code segments combine with the processor to provide a unique device that operates analogously to specific logic circuits. Such processing devices might include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments might also be implemented in the form of a bitstream or other sequence of signal values electrically or optically transmitted through a medium, stored magnetic-field variations in a magnetic recording medium, etc., generated using a method and/or an apparatus as recited in the claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing the embodiments and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments.

It will be further understood that various changes in the details, materials, and arrangements of the parts that have been described and illustrated herein might be made by those skilled in the art without departing from the scope of the following claims.

We claim:

1. A method of generating an image of a region of interest (ROI) of a target object by an imaging system, the method comprising:

determining a plurality of concentric circular rings over the ROI, each of the plurality of concentric rings having a radius incremented by a pitch value from an innermost concentric ring having a minimum radius to an outermost concentric ring having a maximum radius;

uniformly dividing each ring into sub-rings, each sub-ring having a predefined pitch;

dividing the rings and sub-rings into sectors having predefined angular shifts;

correlating the sectors with polar coordinates;

determining scan trajectories with a plurality of sampling positions correlated to the polar coordinates to capture images of each of the plurality of concentric rings and sub-rings;

iteratively shifting the target along the scan trajectories and capturing images at the sampling positions;

forming images of each ring in polar coordinates from the captured images;

extracting super resolution (SR) pixels from the polar coordinate ring images to reconstruct an SR image of each of the rings in the polar coordinates; and projecting the SR images into Cartesian coordinate images.

2. The method of claim 1 wherein the sampling positions comprise each sector at its respective correlated polar coordinate.

3. The method of claim 1 wherein the imaging system comprises a camera with a camera array of pixels, determining sampling positions comprises matching arrays of the camera array pixels with the sector polar coordinates, and wherein forming images of each ring in polar coordinates is performed by interpolation from captured camera array pixels.

4. The method of claim 1 wherein generating a reconstructed SR image comprises performing iterative back-propagation (IBP) with the formed polar coordinate images of each ring.

5. The method of claim 1 wherein reconstructing an SR image comprises stitching together the SR images of each ring into a combined SR image.

6. A system for generating an image of a region of interest (ROI) of a target object, the system comprising:

a camera;

a target stage configured to receive the target object, the target stage configured to provide a translational movement and a rotational movement of the target object; and a controller configured to:

control the camera and target stage to iteratively shift the target along scan trajectories of sample locations to capture images of each of a plurality of concentric rings and sub-rings of a predefined radial pitch over the ROI, the sample locations represented by polar coordinates defining sectors of each of the sub-rings;

extract super resolution (SR) pixels from the images to reconstruct an SR image of each of the rings in the polar coordinates; and project the SR images into Cartesian coordinate images.

7. The system of claim 6 wherein the sample locations include each polar coordinate of each of the sub-rings.

8. The system of claim 6 wherein the sample positions are determined by matching the polar coordinates with pixels of the Camera system within a predetermined shift and the controller is further configured to:

control the camera and target stage to capture the pixels matched with the polar coordinates; and interpolate polar coordinate pixels from the captured Camera pixels.

9. The system of claim 8 wherein each of the polar coordinate pixels is overlapped by at least two pixels of the Camera system.

10. A method of generating an image of a region of interest (ROI) of a target object by an imaging system, the method comprising:
  determining a plurality of concentric circular rings over the ROI, each of the plurality of concentric rings having a radius incremented by a pitch value from an innermost concentric ring having a minimum radius to an outermost concentric ring having a maximum radius;
  uniformly dividing each ring into sub-rings, each sub-ring having a predefined pitch, and dividing the rings and sub-rings into sectors of predefined angular shifts;
  correlating the sectors with polar coordinates;
  determining scan trajectories with a plurality of sampling positions for an imaging system, the imaging system having a camera pixel array correlated to the polar coordinates to within a predetermined offset;
  iteratively shifting the target along the scan trajectories and capturing images at the sampling positions;
  interpolating polar coordinates from the captured images to form images of each ring;
  extracting super resolution (SR) pixels from the polar coordinate ring images to reconstruct an SR image of each of the rings in the polar coordinates; and
  projecting the SR images into Cartesian coordinate images.

11. The method of claim 10 wherein the predetermined offset is constrained by $|1-f_r(l,i,j)|<b_{Dr}$ and $|f_a(l,i,j)|<b_{Da}$ where $b_{Dr}$ is the maximum misalignment in radial offset and $b_{Da}$ is the maximum misalignment in angular offset where $$f_r(l, i, j) = \frac{1}{\sqrt{1+\left[\frac{(j-1)}{l \cdot M + (i-1)}\right]^2}},$$

$$f_a(l, i, j) = \frac{(j-1)}{(l \cdot M + (i-1))^2 + (j-1)^2} \cdot \frac{dr}{dX} \cdot \frac{1}{d\alpha_l},$$

and (i, j) is an array pixel on ring l having arrays of the size M×N.

12. The method of claim 10 wherein generating a reconstructed SR image comprises performing iterative back-propagation (IBP) with the formed polar coordinate images of each ring and stitching together the SR images of each ring into a combined SR image.

* * * * *